(12) United States Patent
Kuroki

(10) Patent No.: US 7,551,313 B2
(45) Date of Patent: Jun. 23, 2009

(54) IMAGE PROCESSING DEVICE, IMAGE PROCESSING METHOD, PROGRAM, AND COMPUTER READABLE RECORDING MEDIUM ON WHICH THE PROGRAM IS RECORDED

(75) Inventor: Jun Kuroki, Machida (JP)

(73) Assignee: Minolta Co., Ltd., Osaka-Shi, Osaka (JP)

( * ) Notice: Subject to any disclaimer, the term of this patent is extended or adjusted under 35 U.S.C. 154(b) by 951 days.

(21) Appl. No.: 10/385,750

(22) Filed: Mar. 12, 2003

(65) Prior Publication Data

US 2004/0100656 A1    May 27, 2004

(30) Foreign Application Priority Data

Nov. 27, 2002    (JP)    ............................. 2002-343951

(51) Int. Cl.
G06F 3/12    (2006.01)
G06F 11/30    (2006.01)
(52) U.S. Cl. .................... 358/1.2; 358/1.16; 358/404
(58) Field of Classification Search ............... 358/1.15, 358/1.9, 1.18, 426.01, 515, 523, 1.16, 404, 358/453, 462, 487, 426.05; 382/232, 1.66, 382/240, 244; 345/112; 707/104.1; 710/57
See application file for complete search history.

(56) References Cited

U.S. PATENT DOCUMENTS

| | | | | |
|---|---|---|---|---|
| 4,805,135 | A | * | 2/1989 | Ochi et al. ................. 358/1.15 |
| 5,038,383 | A | * | 8/1991 | Usumoto et al. ............ 382/235 |
| 5,636,294 | A | * | 6/1997 | Grosse et al. ............... 382/239 |
| 6,061,473 | A | * | 5/2000 | Chen et al. .................. 382/235 |
| 6,067,553 | A | | 5/2000 | Downs et al. |
| 6,166,716 | A | * | 12/2000 | Kashino ...................... 726/19 |
| 6,407,821 | B1 | * | 6/2002 | Hohensee et al. .......... 358/1.15 |
| 6,421,134 | B1 | * | 7/2002 | Kuroshima et al. ........ 358/1.15 |
| 6,747,762 | B1 | * | 6/2004 | Josephsen et al. .......... 358/453 |
| 6,867,879 | B1 | * | 3/2005 | Sasaki et al. ............... 358/1.18 |
| 7,072,055 | B1 | * | 7/2006 | Carter et al. ............... 358/1.15 |
| 7,075,681 | B1 | * | 7/2006 | Brothers ................ 358/426.01 |
| 7,130,471 | B2 | * | 10/2006 | Bossut et al. ............... 382/232 |
| 7,362,457 | B1 | * | 4/2008 | Shima ....................... 358/1.15 |

FOREIGN PATENT DOCUMENTS

| | | |
|---|---|---|
| JP | 2001-043052 | 2/2001 |
| JP | 2001-236186 | 8/2001 |
| JP | 2002-244823 | 8/2002 |

* cited by examiner

*Primary Examiner*—King Y Poon
*Assistant Examiner*—Allen H Nguyen
(74) *Attorney, Agent, or Firm*—Buchanan Ingersoll & Rooney PC

(57) ABSTRACT

A PC transmits a PDF document file after applying conversion processes to a specified object of the objects included in the file in order to reduce the file size when the storage capacity required for printing the PDF file exceeds the usable storage capacity of the printer.

35 Claims, 23 Drawing Sheets

```
1 →   % PDF.1.4
      1 0 obj
      ≪ /Type /Catalog
      /Outlines 2 0 R
      /Pages 3 0 R
      ≫
2 →   endobj
      2 0 obj
      ≪ /Type Outlines
      /Count 0
      ≫
3 →   endobj
      3 0 obj
      ≪ /Type /Pages
      /Kids [4 0 R]
      /Count 1
      ≫
4 →   endobj
      4 0 obj
      ≪ /Type /Page
      /Parent 3 0 R
      /MediaBox [0 0 612 792]
      /Contents 5 0 R
      /Resources ≪ /ProcSet 6 0 R ≫
      ≫
5 →   endobj
      5 0 obj
      ≪ /Length 35 ≫
      stream
      ···Page-marking operators···
      endstream
6 →   endobj
      6 0 obj
      [/PDF]
530 → endobj
      xref
      0 7
      0000000000 65535 f
      0000000009 00000 n
      0000000074 00000 n
      0000000120 00000 n
      0000000179 00000 n
      0000000300 00000 n
540 → 0000000384 00000 n
      trailer
      ≪ /Size 7
      /Root 1 0 R
      ≫
      startxref
      408
      %%EOF
```

IMAGE PROCESSING DEVICE, IMAGE PROCESSING METHOD, PROGRAM, AND COMPUTER READABLE RECORDING MEDIUM ON WHICH THE PROGRAM IS RECORDED

This application is based on Japanese Patent Application No. 2002-343951, filed on Nov. 27, 2002, the contents of which are hereby incorporated by reference.

BACKGROUND OF THE INVENTION

1. Field of the Invention

The invention relates to an image processing device, an image processing method, a program, and a computer readable recording medium on which the program is recorded. In particular, the invention relates to an image processing device, an image processing method, a program, and a computer readable recording medium on which the program is recorded, for transmitting and printing a document file, which includes objects that can be arranged within the file in an order different from the order of pages as well as reference information that indicates the locations of the objects in the file, and which defines pages having a specified object, from the image processing device to an image forming device without converting the document file into print data.

2. Description of the Related Art

A personal computer ("PC") is capable of transmitting for printing a document file stored in, for example, a hard disk to a printer via a network such as LAN.

In this case, the document file is typically transmitted after being converted into print data described in a printer-recognizable PDL (Page Description Language) such as PS (PostScript®) by means of a printer driver installed in the PC.

On the other hand, PDF (Portable Document Format) files are widely used and distributed over the Internet as a type of document file that can be reproduced in the same format as the original document regardless of the types of hardware or application. The PDF file has objects that can be arranged in a file in an order different from the order of pages and reference information that indicates the locations of the objects in the file, and defines a page consisting of specified objects.

In the meanwhile, a PDF file may contain several hundreds of pages of data. When such a large PDF file is converted into print data by a PC, the load on the PC can be enormous due to the reason that it takes a long time to convert, requires a complicated process, and it takes a long time to transmit the data as the data size increases as a result of the conversion, etc. In order to lighten the PC's load, printers that are capable of directly printing a PDF file transmitted directly from a PC without the conversion ("PDF direct printing") have been proposed.

However, although a printer can print in the normal order, i.e., from the top page of the print data received, in case of print data that are described in PDL such as PS as the data to be printed are arranged in the order of pages in a file, a printer cannot print even in the normal order until after the entire data is received in case of a PDF file as the data to be printed can be arranged unrelated to the order of pages in the file. Consequently, such a printer sometimes ends up being unable to print a PDF file as it cannot receive the entire file due to the limitation of its storage capacity (usable capacity or vacant capacity).

In connection with this problem, devices that are capable of reconstituting the contents of a PDF file in order to display the data in the order of receipt without having to receive the entire PDF file have been proposed (e.g., U.S. Pat. No. 6,067,553).

However, in case of the device disclosed in the abovementioned issued patent, it still requires a complicated process for reconstituting a PDF file on the transmission side, such as a PC, prior to the file transfer. Therefore, the technology in the above device has a problem that it does not reduce the load on the PC compared to converting PDF files into print data described in PDL such as PS.

Moreover, the abovementioned technology is basically a technology of displaying on display units so that it does not take much consideration in printing on printers. More specifically, in case there is a need of printing a file in the order different from the order of pages in the file, such as in a case when a special printing condition, for example, face up, is applied, where printing is executed from the last page to the top page sequentially, the above-mentioned technology cannot be used.

SUMMARY OF THE INVENTION

It is an object of the present invention to provide an image processing device, an image processing method, a program, and a computer readable recording medium on which the program is recorded, which are improved for solving the abovementioned problems.

A more specific object of the present invention is to provide an image processing device, an image processing method, a program, and a computer readable recording medium on which the program is recorded for making it possible to print more securely even when document files such as PDF files are transmitted without being converted to print data to an image forming device having a memory unit with a limited amount of usable capacity while simultaneously suppressing the load on the transmission side.

According to an aspect of the invention, there is provided an image processing device for transmitting a document file, which contains objects that can be arranged in the file in an order different from the order of pages as well as reference information that indicates the locations of the objects within the file, and which defines pages having a specified object, to an image forming device without converting the document file into print data, comprising: a comparator for comparing the size of a document file to be printed with the usable storage capacity of the image forming device used for printing the document file; a converter for converting a specified object among the objects included in the document file in order to reduce the file size when the storage capacity required for printing the document file exceeds the usable storage capacity of the image forming device as a result of the comparison by the comparator; and a transmitter for transmitting the document file processed by the converter to the image forming device.

The invention makes it possible to transmit a document file such as a PDF file without converting the document file into print data to an image forming device having a storage unit with a limited amount of usable capacity to be printed securely. Moreover, since an appropriate conversion process is performed considering the usable capacity of the storage unit in the image forming device for each object included in the document file on the document file transmitting side, the transmitting side's load can be alleviated. Moreover, the image forming device can easily handle any special printing conditions such as booklet stitching or face up, which require printing a file in an order different from the order of pages in the file, by analyzing the received document file, as it is possible to transmit the document file in a lump securely from the image processing device to the image forming device.

According to another aspect of the invention, there is provided an image processing method for transmitting a document file, which includes objects that can be arranged in the file in an order different from the order of pages as well as reference information that indicates the locations of the objects within the file, and which defines pages having a specified object, to an image forming device without converting the document file into print data, comprising the steps of: 1) comparing the size of a document to be printed with the usable storage capacity of the image forming device used for printing the document file; 2) converting a specified object among the objects included in the document file in order to reduce the file size when the storage capacity required for printing the document file exceeds the usable storage capacity of the image forming device as a result of the comparison in step 1); and 3) transmitting the document file processed in step 2) to the image forming device.

According to still another aspect of the invention, there is provided a program to be used in an image processing device for transmitting a document file, which includes objects that can be arranged in the file in an order different from the order of pages as well as reference information that indicates the locations of the objects within the file, and which defines pages having a specified object, to an image forming device without converting the document file into print data, the program causing the image processing device to execute a process comprising the steps of: 1) comparing the size of a document to be printed with the usable storage capacity of the image forming device used for printing the document file; 2) converting a specified object among the objects included in the document file in order to reduce the file size when the storage capacity required for printing the document file exceeds the usable storage capacity of the image forming device as a result of the comparison in step 1); and 3) transmitting the document file processed in step 2) to the image forming device.

The objects, characteristics and properties of this invention other than those set forth above will become apparent from the description given herein below with reference to preferred embodiments illustrated in the accompanying drawings.

BRIEF DESCRIPTION OF THE DRAWINGS

FIG. 5 shows a sample of the PDF file;

DETAILED DESCRIPTION OF THE PREFERRED EMBODIMENTS

The embodiments of this invention will be described below with reference to the accompanying drawings.

Figure 1:
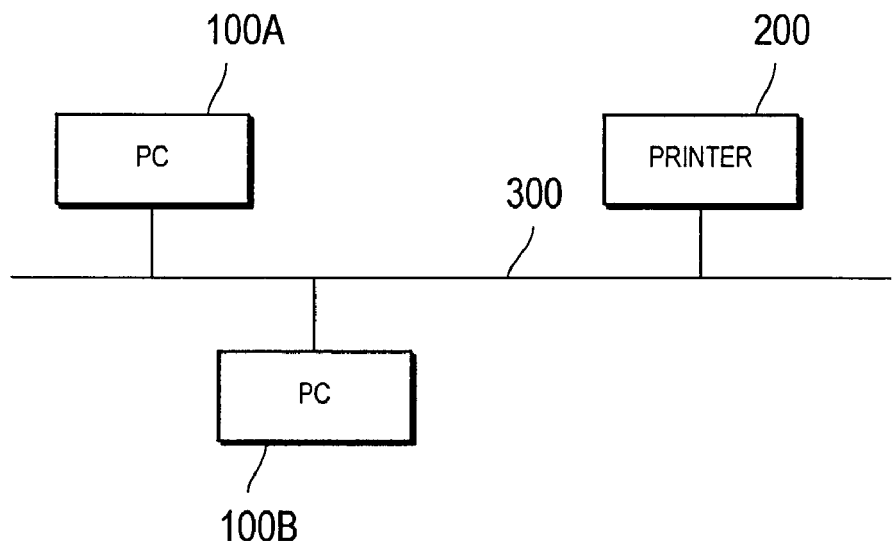
FIG. 1 is a block diagram showing the constitution of a printing system including PCs and a printer according to an embodiment of the present invention.

FIG. 1 is a block diagram showing the constitution of a printing system including a PC and a printer according to an embodiment of the present invention. As shown in FIG. 1, the printing system is equipped with PCs 100A and 100B having a function as an image processing device and a printer 200 as an image forming device which are connected communicably with each other via a network 300. The network 300 consists of a LAN based on standards such as Ethernet®, Token Ring, FDDI, etc., and a WAN consisting of LANs connected by a dedicated line.

The types and the number of equipment to be connected to the network are not limited to those shown in FIG. 1. The printer 200 can be connected directly with PC 100A or 100B (local connection) without going through the network 300.

Figure 2:
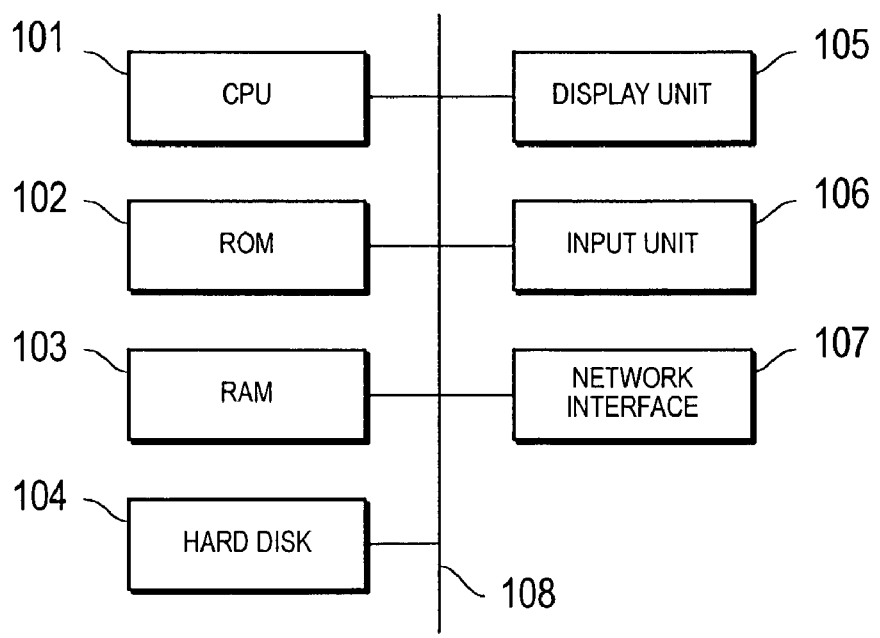
FIG. 2 is a block diagram showing the constitution of the PCs shown in FIG. 1.

FIG. 2 is a block diagram showing the constitution of the PC 100A or 100B shown in FIG. 1. As shown in FIG. 2, the PC 100A or 100B contains a CPU 101 for controlling the entire device and executing various computations, a ROM 102 for storing programs and data, a RAM 103 for storing programs and data temporarily, a hard disk 104 as an external storage unit for storing various programs and data, a display unit 105 such as a liquid crystal display for displaying various information, an input unit 106 consisting of a keyboard, a mouse, etc., for entering various instructions, and a network interface 107 such as a LAN card for connecting to the network 300, all of which are interconnected via a bus 108 for exchanging signals.

Figure 3:
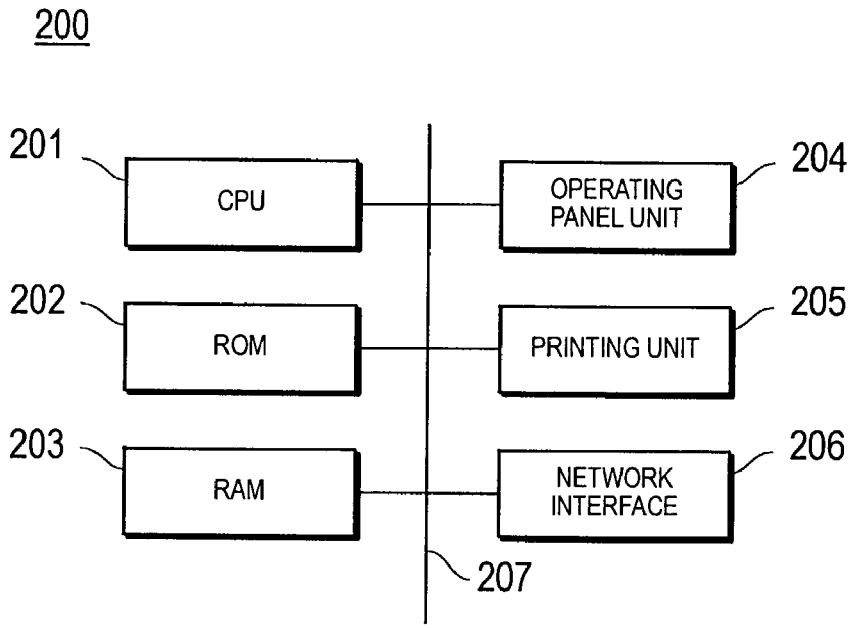
FIG. 3 is a block diagram showing the constitution of the printer shown in FIG. 1.

FIG. 3 is a block diagram showing the constitution of the printer 200 shown in FIG. 1. As shown in FIG. 3, the printer 200 contains a CPU 201, a ROM 202, a RAM 203, an operating panel unit 204, a printing unit 205, and a network interface 206, all of which are interconnected via a bus 207 for exchanging signals. Of the constituting elements of the printer 200, those that have the identical functions as the constituting members of the PCs 100A and 100B are not described here to avoid duplications.

The RAM 203 can store the data received from the PC temporarily. The ROM 202 stores font information concerning fonts of characters. The printer 200 can be equipped with a hard disk as an external storage unit for storing various programs and data. The operating panel unit 204 is used for various information displays and entering various instructions. The printing unit 205 prints various data on a recording medium such as paper using a known image forming process such as an electronic photography type process.

The PCs 100A and 100B as well as the printer 200 can contain constitutional elements other than those described above, or may not include a portion of the abovementioned elements. A case of transmitting data from the PC 100A to the printer 200 for printing will be described below.

In the printing system shown in FIG. 1, two types of printing, namely, the normal printing and the PDF direct printing, are possible. In executing the normal printing, a specific file is transmitted to the printer 200 after being converted into print data described in PDL such as PS by means of a printer driver installed in the hard disk 104 of PC100A. On the other hand, in executing the PDF direct printing, a PDF file is transmitted from the PC100A to the printer 200 without being transformed into print data according to a program (to be described later) installed in the hard disk 104.

Figure 4:
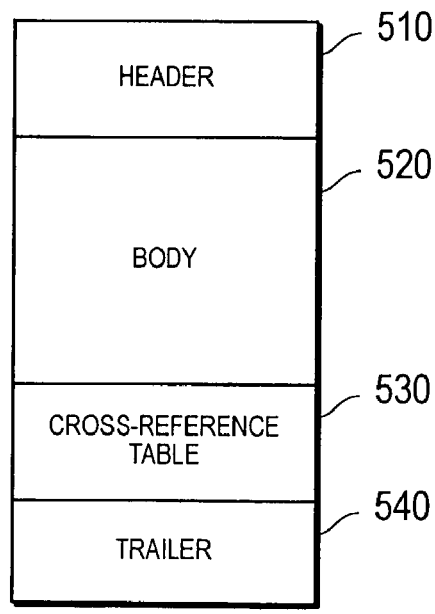
FIG. 4 is a diagram for describing a standard PDF file.

The structure of a standard PDF file and the method of analyzing the PDF file will be described below with reference to FIG. 4 and FIG. 5. FIG. 4 is a diagram for describing the constitution of a standard PDF file, and FIG. 5 is a diagram showing a sample of the PDF file. FIG. 4 and FIG. 5 are prepared using "PDF Reference Third Edition Adobe Portable Document Format, Version 1.4", (Adobe Systems Incorporated) as a reference.

As can be seen from FIG. 4 and FIG. 5, a standard PDF file 500 consists of a header 510, a body 520, a cross-reference table 530, and a trailer 540.

The header 510 contains a comment that starts with %. From the header 510 shown in FIG. 5, one can see that the file's format is PDF, and the version (1.4 in this case) of the PDF specification.

The body 520 consists of a combination of multiple minimum units called objects (objects 1 through 6 in FIG. 5). The objects are individual elements that constitute a document. The objects contain various kinds of information, for example, structural information of the document, page information showing the structure of a page, font information concerning fonts of characters, character information including character data expressed in character codes, graphics information including graphics data expressed in combinations of graphics such as lines, and image data expressed by groups of pixels. For example, the first object 1 is defined by the description from "10 obj" to "endobj" and other objects are also defined in a similar manner. Here, the first numeral and the second numeral in "10 obj" represent the ID number and the generation number of an object.

The cross-reference table 530 is reference information that indicates the position of the object within a file. In the cross-reference table 530, the locations of various objects with specific ID numbers (1 through 6 in FIG. 5) are shown by the number of bytes (offset) from the front of the file to the front of the objects. This makes it possible to access the objects lined up in the body 520 at random. The cross-reference table 530 starts with a key word named "xref" in the actual file.

The trailer 540 is information to be accessed at the startup of the file analysis. More specifically, the location information of the cross-reference table 530 in the file and the ID number of an object (a root object to be the root of the hierarchical structure) that needs to be referenced first will be described in the trailer 540. The number that is indicated next to "startxref" is the number of bytes (offset) from the front of the file to the front of the cross-reference table 530. The row that includes "root" shows the ID number of the root object. Also, the row that includes "size" shows the number of objects existing in the file including the first entry (the ID number of the object is "0") of the cross-reference table 530. The trailer 540 exists in the end of the file and starts with a row that includes a key word named "trailer."

The device for analyzing PDF files, in analyzing a standard PDF file, analyzes the trailer 540 that exists at the end of the file first, and then analyzes the cross-reference table 530. Based on the information obtained in these analyses, it can analyze the contents of the page described in the body 520. The object contains the ID number of another object where the data that is required next is described. Consequently, by tracing the ID number of the object required next, the total analysis of the PDF file becomes possible. As the ID numbers of the objects that are to be referenced are indicated, the objects need not be arranged in the order of analyses in the body of the PDF file. Therefore, the objects can be described in the body of the PDF file in an arbitrary order and consequently be arranged in the file in an order different from the order of pages.

Figure 6:
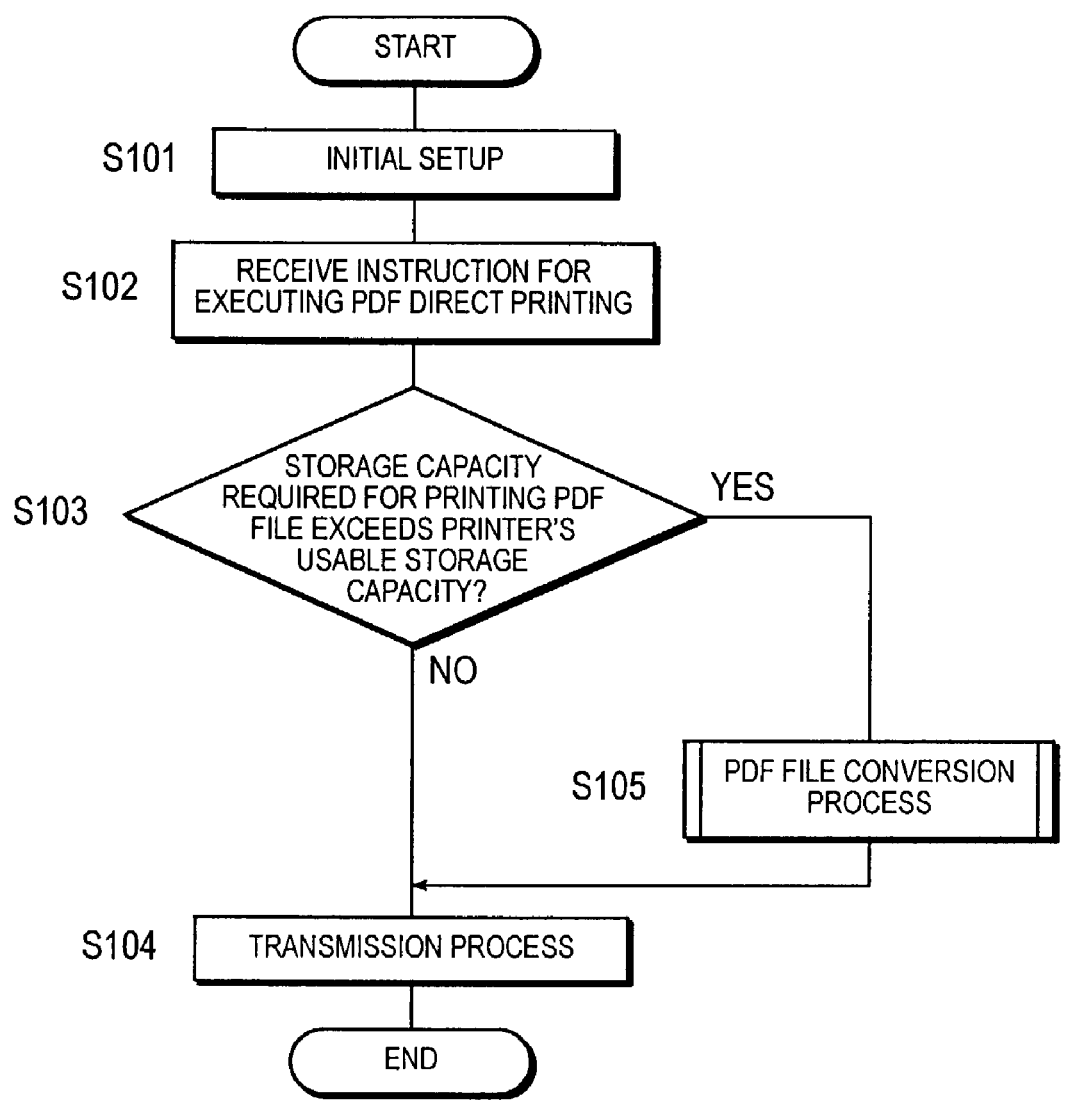
FIG. 6 is a flowchart for describing the process conducted in the PCs.
Figure 7:
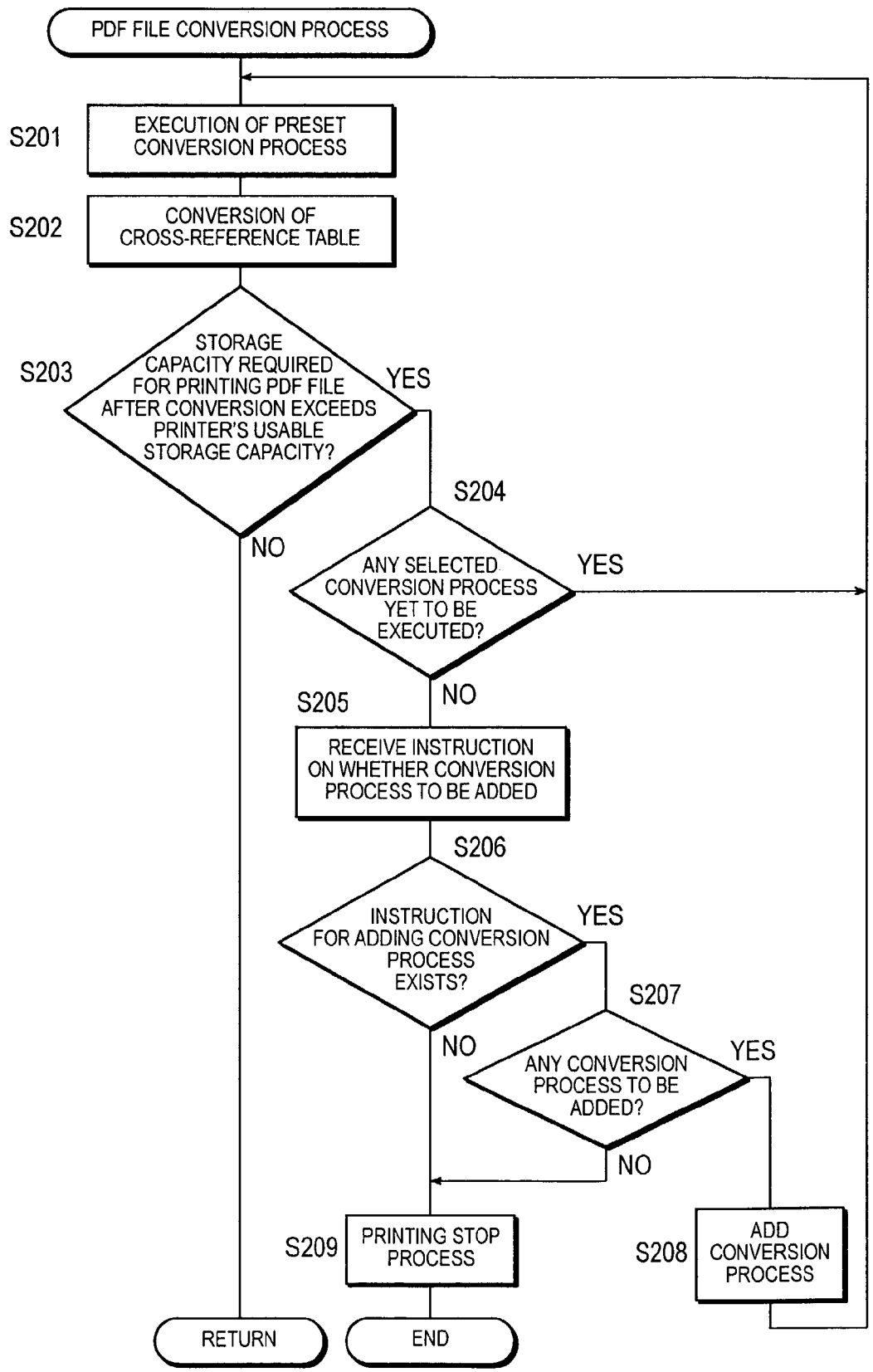
FIG. 7 is a flowchart for describing the PDF file conversion process shown in FIG. 6.

Next, the process performed in the PC100A will be described with reference to FIG. 6 and FIG. 7. The algorithms shown in the flowchart of FIG. 6 and FIG. 7 are stored as a program in a storage unit such as a hard disk 104 of the PC 100A and executed by the CPU 101.

What is described below is that the normal printing where a printer driver is used for the PDF file is not executed but the PDF direct printing is executed to print the PDF file by means of the printer 200.

First, an Initial setup is done prior to the user's instruction for executing the PDF direct printing (S101). The initial setup includes the setups for the output printer, the printer's proper information, the printing condition, and the conversion process for the objects in order to reduce the file size.

The output printer is set up based on the user's operation through the input unit 106.

The printer's proper information includes the usable capacity of the memory installed in the printer, whether the hard disk is equipped or not, and the usable capacity of the hard disk in case the printer is equipped with the hard disk. The printer's proper information also includes the information concerning the fonts installed in the printer, whether the printer is color or monochromatic, the information concerning the supported paper sizes, and whether the double side printing unit is provided. The PC 100A obtains the printer's proper information from the printer 200 by requesting the same from the printer 200, which will be the output unit. However, the printer's proper information can also be obtained by a request from the PC 100A to the printer 200 during the start up time of the PC 100A or the printer 200. The usable storage capacity of the printer should preferably be a dynamic value that corresponds to the memory's usage condition. The usable storage capacity of the printer can also be a fixed value, which still provides a certain effect. Certain items of the proper information of the printer 200 can be set up manually in advance in the PC 100A as well.

The printing condition is set up based on the user's operation through the input unit 106. The printing condition here means the attribute related to the order of printing the pages. The printing condition includes such items as whether the booklet stitching process, the face up process, in which printing is executed from the last page backward toward the first page, or the N-in-1 process, in which multiple pages (N pages) of information is printed on a single sheet in a reduced size, is performed, the number of copies, and whether the collation process is employed for printing multiple copies. However, the printing condition may include other attributes related to printing, such as whether the double side printing process is employed. The printing condition can also be set up on the printer 200 through the operating panel unit 204.

The conversion process applied to an object in order to reduce the file size can be classified into the conversion process applied to an image area which is the object related to image data, the conversion process applied to a character area which is the object related to character data, and the conversion process applied to a graphics area which is the object related to graphics data.

The conversion process applied to the image area includes conversion processes, for example, of the following nine patterns, A through I. In the conversion process of the pattern A, all the image data included in the PDF file will be deleted. In the conversion process of the pattern B, all the image data included in the PDF file will be rewritten into information that indicate the storage locations of the image data in the transmission source of the PDF file. In the conversion process of the pattern C, of all the image data included in the PDF file, those image data with data sizes that exceed a predetermined size limit will be deleted. In the conversion process of the pattern D, of the image data included in the PDF file, those image data with data sizes that exceed a predetermined size limit will be rewritten into information that indicate the storage locations of the image data in the transmission source of the PDF file. In the conversion process of the pattern E, image data included in the PDF file that are not compressed will be compressed. In the conversion process of the pattern F, the image data included in the PDF file will be converted into monochromatic if they are colored. In the conversion process of the pattern G, all the image data included in the PDF file will be converted into monochromatic if the output destination printer is a monochromatic printer. In the conversion process of the pattern H, if a plurality of the same image data exists in the PDF file, only one image data at one point will be left, while the image data for all other points will be converted into descriptions indicating the data to be used. In the conversion process of the pattern I, image data will be converted into reduced image data.

The conversion process applied to the character area includes conversion processes, for example, of two patterns, J and K. In the conversion process of the pattern J, font information will be deleted if font information is included in the PDF file. In the conversion process of the pattern K, bitmap font information will be converted into outline font information if bitmap font information is described in the PDF file.

The conversion process applied to the graphics area includes, for example, conversion process of the pattern L. In the conversion process of the pattern L, all the graphics data included in the PDF file will be deleted.

The conversion process applied to the object intended to reduce the file size is set up by the user's operation through the input unit 106. The user can select one or more patterns from the conversion processes of the pattern A through L. When a plurality of patterns is selected, the user can assign an order of priority to the conversion processes of the selected patterns. Alternatively, the user can specify a simultaneous execution of all the conversion processes of the selected patterns. Combinations of patterns, such as the pattern A and E, that cannot be executed simultaneously, are inhibited by predetermined inhibition rules.

After the initial setup is completed in the step S101, the PC 100A accepts the user's execution instruction for the PDF direct printing of the PDF file (S102). An icon for the application program file of the PDF direct printing is displayed on the desktop of the PC 100A. The user can specify the execution of the PDF direct printing by activating the application program by dragging and dropping the PDF file on the icon. The execution of the PDF direct printing can be specified by other means.

Next, the size of the PDF file to be printed is compared with the usable capacity of the memory (RAM 203) of the printer 200, which is to be used for printing the PDF file, upon which a judgment is made as to whether the storage capacity required for the printing of the PDF file is larger than the usable memory size of the printer 200 (S103). The usable storage capacity is obtained by referencing the printer's proper information.

If the storage capacity required for printing the PDF file is equal to or smaller than the usable storage capacity of the printer 200 (S103: No), the transmission process for the PDF file is executed as is since the entire PDF file can be held in the memory of the printer 200 (S104).

If the storage capacity required for printing the PDF file is larger than the usable storage capacity of the printer 200 (S103: Yes), the conversion process for the PDF file, i.e., the conversion process for the objects intended to reduce the file size is executed (S105). The detail of the PDF file conversion process will be described later. When the PDF file conversion process is completed, the transmission process for the converted PDF file will be performed (S104).

If the printer 200 is equipped with a hard disk, the size of the PDF file to be printed can be compared with the usable capacity of the hard disk of the printer 200 to be used for printing the PDF file in order to make a similar judgment as in the step S103 (S203 is the same).

Next, the PDF file conversion process of the step S105 shown in FIG. 6 will be described below with reference to FIG. 7.

First, the PDF file conversion process set up in the step S101 is executed (S201). If a conversion process of multiple patterns with an order of priority is selected here, the conversion process of the highest priority will be executed. If a simultaneous execution is specified, all the conversion processes of multiple patterns will be executed simultaneously.

Then, the conversion of the cross-reference table will be performed (S202). This is due to the fact that the offset (the number of bytes from the top of the file) of each object changes with the PDF file conversion process.

Next, the size of the PDF file after the conversion process is compared with the usable capacity of the memory of the printer 200, which is to be used for printing the PDF file, upon which a judgment is made as to whether the storage capacity required for printing the PDF file after the conversion process is larger than the usable memory size of the printer 200 (S203).

If the storage capacity required for printing the PDF file after the conversion process is equal to or smaller than the usable storage capacity of the printer 200 (S203: No), the program returns to the flow chart shown in FIG. 6 and the transmission process for the conversion-processed PDF file is executed as the entire conversion-processed PDF file can be held in the memory of the printer 200 (S104).

On the other hand, if the storage capacity required for printing the PDF file after the conversion process is larger than the usable storage capacity of the printer 200 (S203: Yes), a judgment is made as to whether any conversion process is left to be executed among the PDF file conversion processes selected in the step S101 (S204).

If there are some selected PDF files left to be executed (S204: Yes), the program returns to the step S201, and the process of the steps S201 through S204 are repeated according to the order of priority set up by the user.

If there is no selected conversion process for the PDF file left to be executed (S204: No), in other words, the storage capacity required for printing the conversion-processed PDF file is larger than the usable capacity of the printer memory even when all of the conversion processes selected by the user are completed, the system accepts an instruction for whether any conversion process to be executed should be added (S205).

If there is an instruction to add a conversion process (S206: Yes), a judgment is made as to whether any conversion process that can be added exists (S207). If there is a conversion process that can be added (S207: Yes), a PDF file conversion process will be added based on the user's operation through the input unit 106. More specifically, a conversion process to be added will be selected from the conversion processes of the pattern A through L (S208). When a PDF file conversion process is added, the program returns to the step S201, and the process of the steps S201 through S204 are repeated according to the order of priority set up by the user.

On the other hand, if an instruction is made not to add any conversion process (S206: No), or there is no conversion process that can be added (S207: No), a process for printing cancellation is performed (S209).

Figure 8:
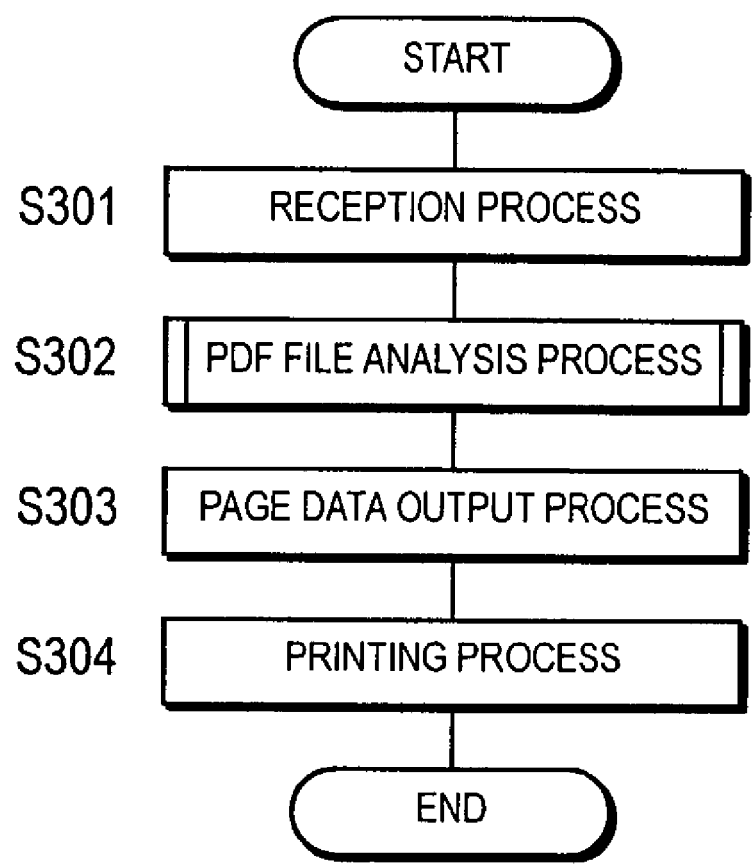
FIG. 8 is a flowchart for describing the process conducted in the printer.
Figure 9:
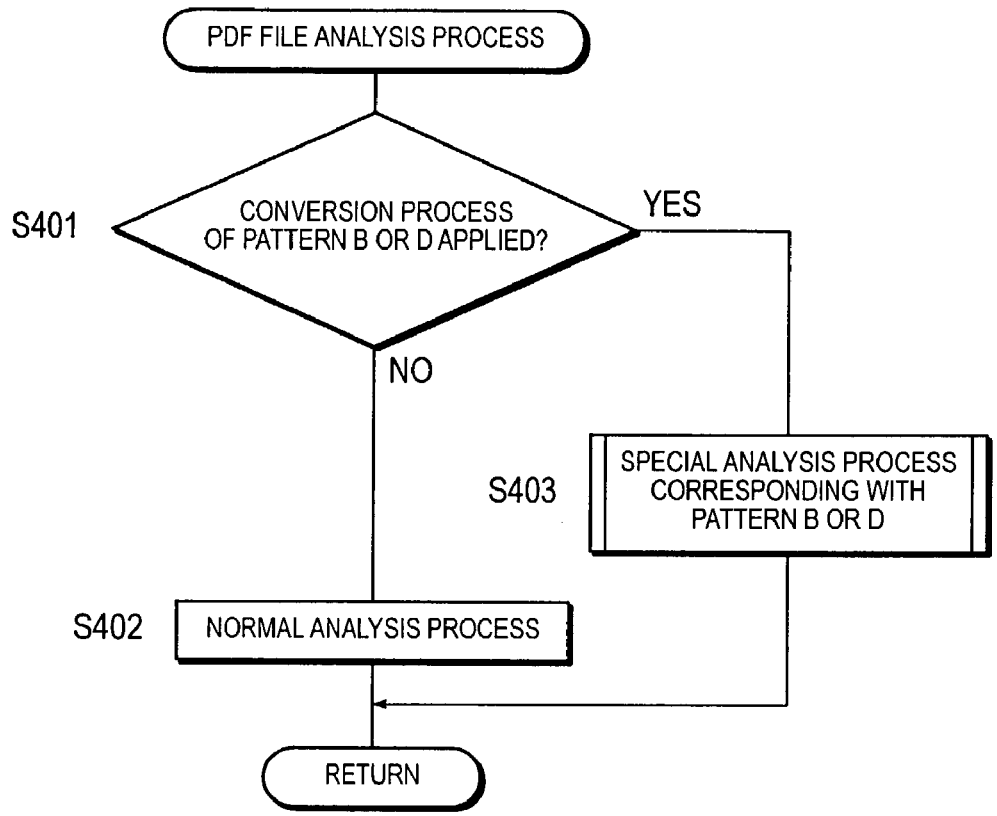
FIG. 9 is a flowchart for describing the PDF file analysis process shown in FIG. 8.
Figure 10:
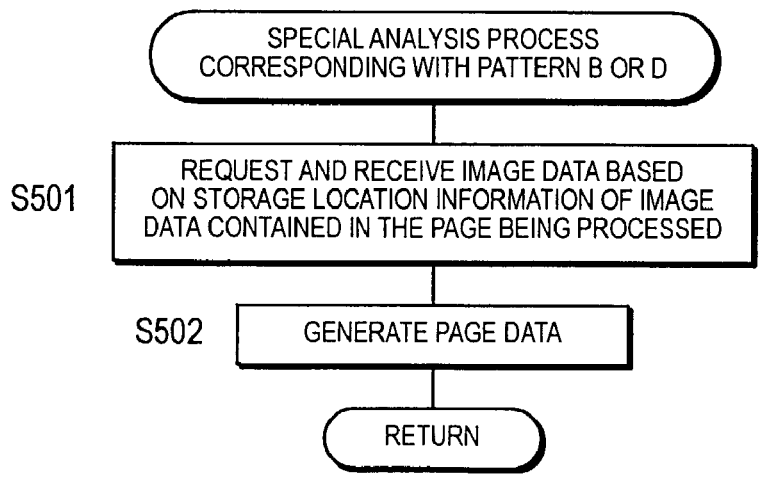
FIG. 10 is a flowchart for describing a special analysis process corresponding to the pattern B or D shown in FIG. 9.

Next, the job process in the printer 200 will be described below referring to FIG. 8 through FIG. 10. The algorithm shown in the flowcharts of FIG. 8 through FIG. 10 is stored as a program in a memory unit such as a ROM 202 of the printer 200 and executed by the CPU 201.

What is described below is a case where the printer 200 receives a PDF file to be printed from the PC 100A and executes the PDF direct printing of the received PDF file.

First, the printer 200 receives the PDF file from the PC 100A (S301). The transmission of the PDF file, which is conversion-processed as needed, by the PC 100A to the printer 200 indicates that the memory (a memory or a hard disk, if the printer is equipped with a hard disk) of the printer 200 has a usable capacity sufficient for securing the storage capacity necessary for printing the PDF file. Therefore, the entire PDF file thus received is stored in the memory as a unit.

Next, the received PDF file is analyzed (S302). The data to be printed is obtained by page by analyzing the PDF file considering the printing condition, and page data rasterized in the bitmap format is generated from the obtained data. The detail of the PDF file analysis process will be described later.

The generated page data is transmitted to the printing unit 205 (S303) and printed on paper (S304). The output of the page data to the printing unit 205 and the printing process are continued until the printing of the entire pages of the PDF file is completed.

Next, the PDF file analysis process of the step S302 shown in FIG. 8 will be described below with reference to FIG. 9.

When the analysis of the PDF file is started, a judgment is made first as to whether the conversion process of the pattern B or D has been applied on the received PDF file (S401).

If the conversion process of neither the pattern B or D has been applied to the received PDF file (S401: No), the normal analysis process will be executed (S402). The printer 200 obtains the data to be printed by page by analyzing the PDF file based on the printing condition and the analysis result of the trailer 540 and the cross-reference table 530 (refer to FIG. 4 and FIG. 5). In this case, if, for example, the face up process is applied to the printing of the PDF file, the data will be obtained sequentially from the last page toward the first page of the file. If the face down process is applied, the data will be obtained sequentially in the same order as the page order of the file. In other words, even in printing the same PDF file, the order of printing pages is different depending on the printing condition. The page data rasterized in the bitmap format is generated from the specific data thus obtained.

On the other hand, if a conversion process of either the pattern B or D has been applied to the received PDF file (S401: Yes), a special analysis process in correspondence with the pattern B or D will be executed (S403).

Next, the special analysis process of the step S403 shown in FIG. 9 will be described below with reference to FIG. 10.

The printer 200 obtains the data to be printed by page by analyzing the PDF file based on the printing condition and the analysis result of the trailer 540 and the cross-reference table 530 similar to the case of the normal analysis process (S402).

Based on the information indicating the storage location of the image data, a request of the image data is made to the transmission source and the requested image data is received (S501).

The page data rasterized in the bitmap format is generated from the data thus obtained (S502).

Next, a detail description will be made below using the drawings on a series of steps taken when the conversion process (pattern A through L) is performed on the specified objects among the objects included in the PDF file to be printed in order to reduce the file size.

Figure 11:
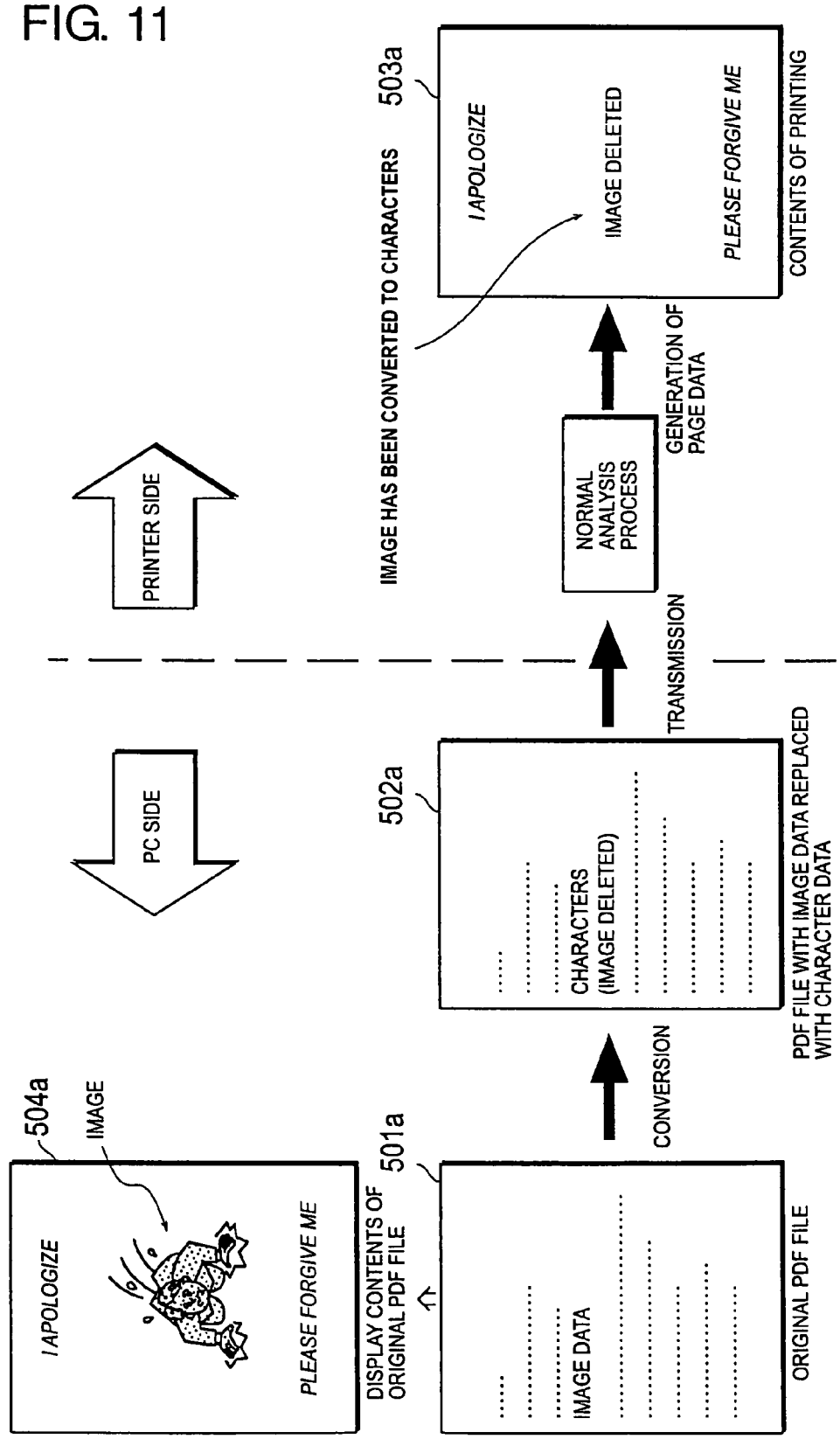
FIG. 11 is an outline diagram for describing a series of steps when the conversion process for the pattern A is executed.
Figure 12:
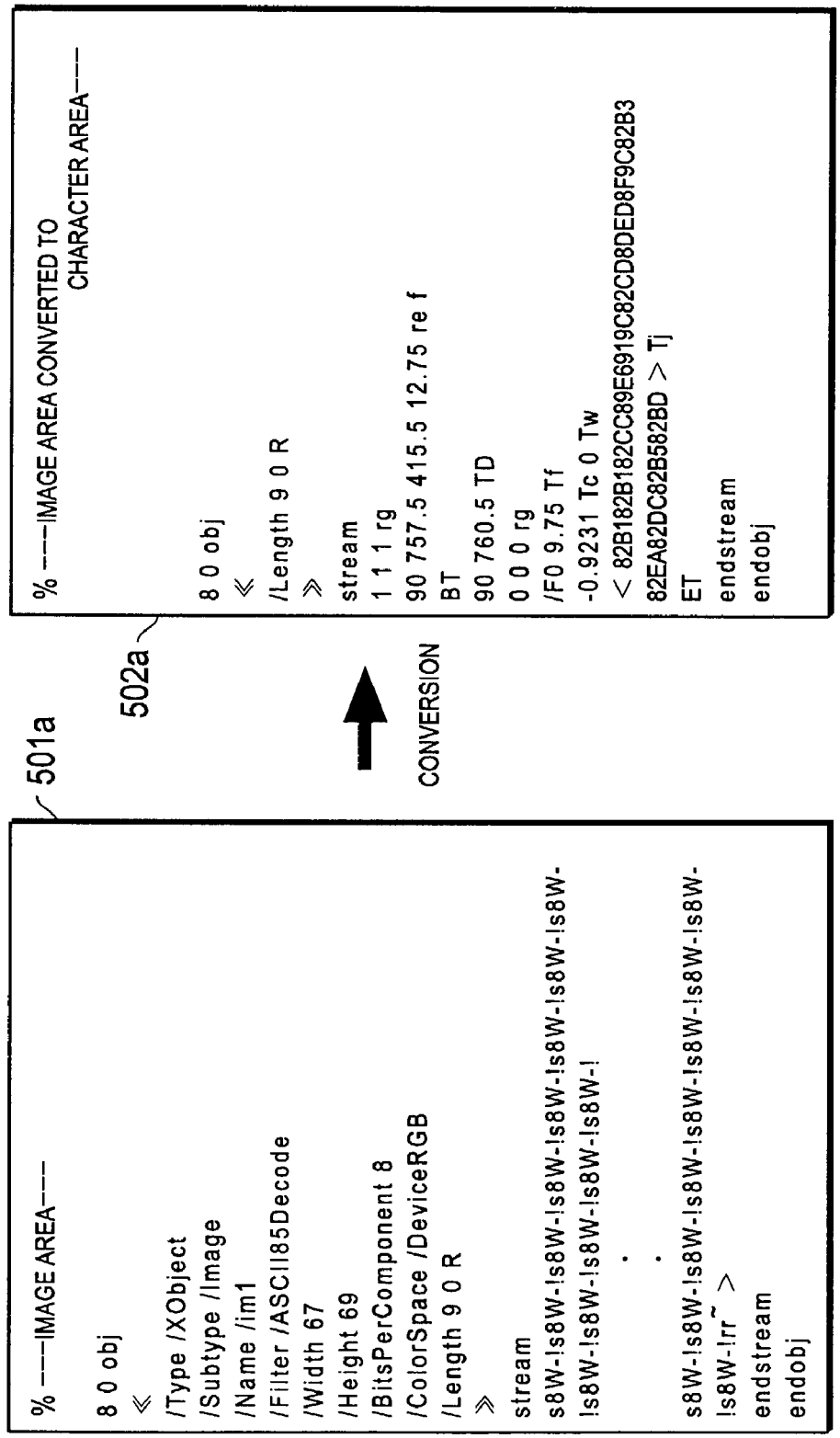
FIG. 12 is a diagram describing the conversion process of the pattern A on the source code level.

FIG. 11 is an outline diagram for describing a series of steps when the conversion process for the pattern A is executed, and FIG. 12 is a diagram describing the conversion process of the pattern A on the source code level.

As shown in FIG. 11 and FIG. 12, all the image data included in the PDF file 501a are deleted in the conversion process of the pattern A. In this case, it is preferable that the image data is rewritten into specific character data (refer to file 502a). A comment "Image deleted" will be printed on paper in place of the image in the display contents 504a of the original PDF file (refer to printing contents 503a).

Additionally, in the conversion process of the pattern C, of all the image data included in the PDF file, those image data with data sizes that exceed a predetermined allowable data size will be deleted. This conversion process is identical to the conversion process of the pattern A except that the allowable data size is set (e.g., 5 MB).

Figure 13:
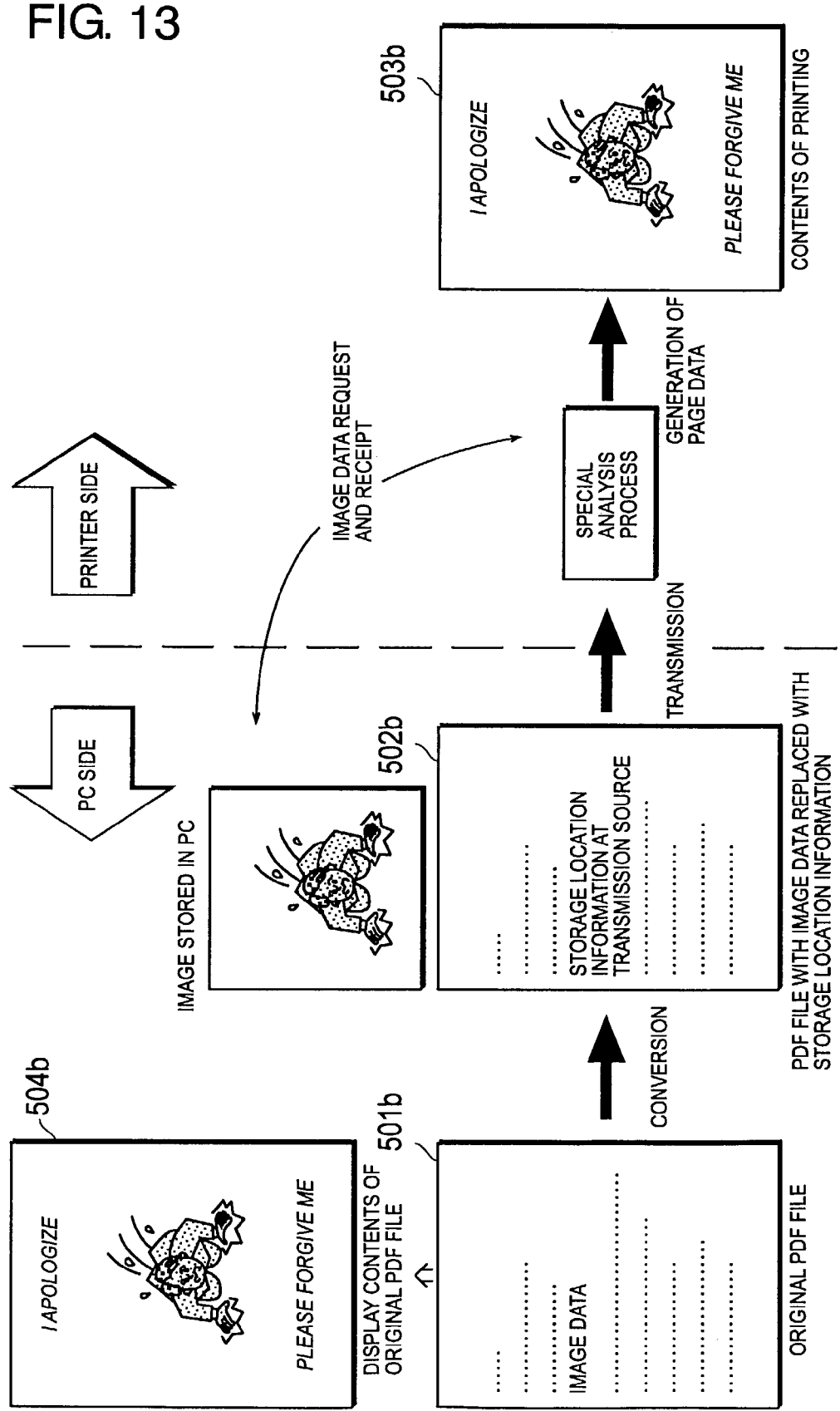
FIG. 13 is an outline diagram for describing a series of steps when the conversion process for the pattern B is executed.
Figure 14:
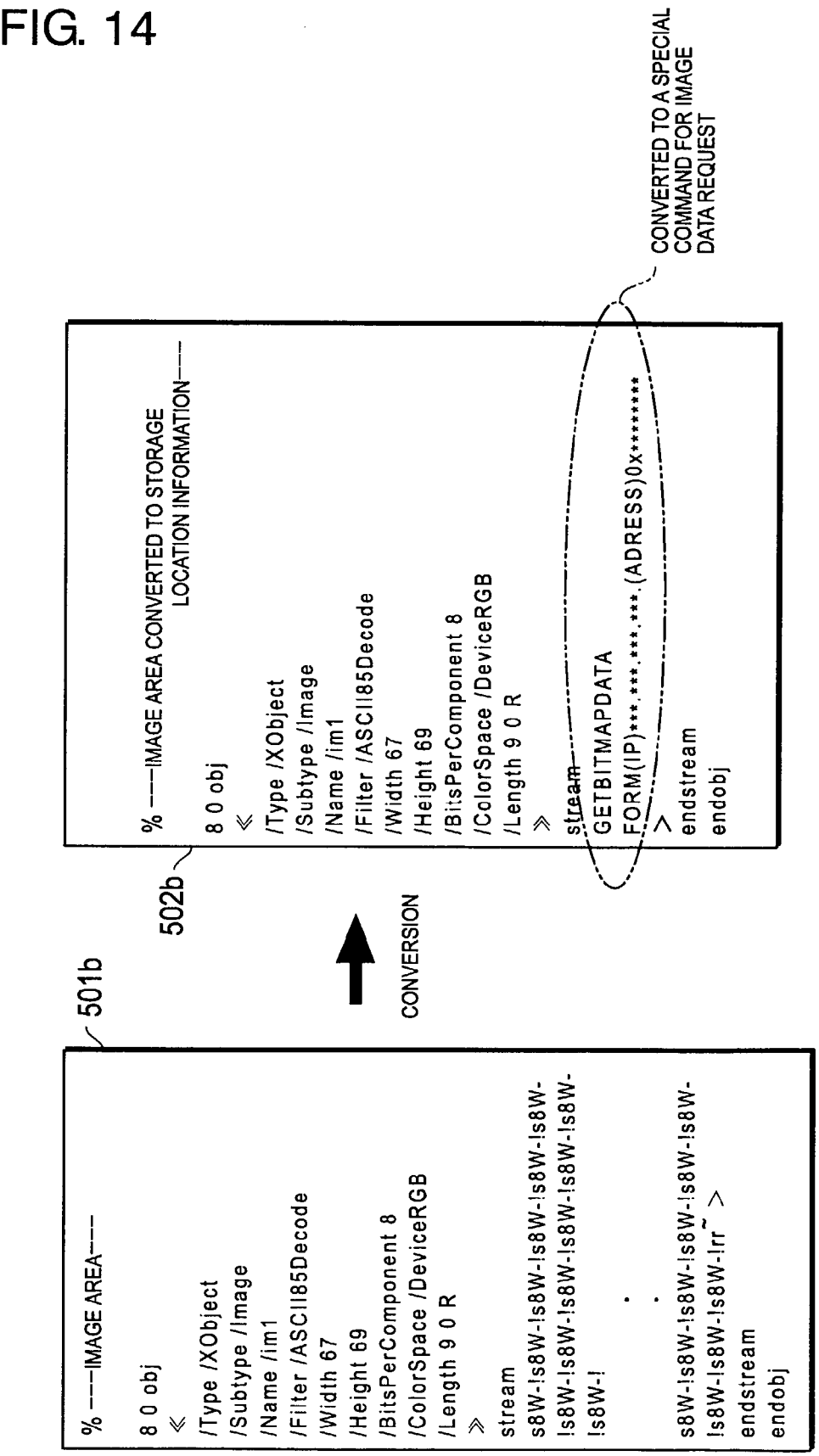
FIG. 14 is a diagram describing the conversion process of the pattern B on the source code level.

FIG. 13 is an outline diagram for describing a series of steps when the conversion process for the pattern B is executed, and FIG. 14 is a diagram describing the conversion process of the pattern B on the source code level.

As shown in FIG. 13 and FIG. 14, in the conversion process of the pattern B, all the image data included in the original PDF file 501*b* will be replaced with information indicating the storage location of the image data in the transmission source of the PDF file (refer to the file 502*b*). More specifically, the image data is converted into a special command showing a transmission request for the image data including the storage location information of the image data. Therefore, the printer 200 on the receiving side can obtain image data by requesting the image data from the transmission source. In this case, the printer 200 generates page data after obtaining necessary image data from the PC 100A by conducting a special analysis process (refer to FIG. 10) corresponding to the pattern B or D. The data reproducing the display contents 504*b* of the original PDF file can thus be printed on paper (refer to the printing contents 503*b*).

Additionally, in the conversion process of the pattern D, of the image data included in the PDF file, those image data with data sizes that exceed a predetermined allowable data size will be rewritten into information that indicate the storage locations of the image data in the transmission source of the PDF file. This conversion process is identical to the conversion process of the pattern B except that the allowable data size is set (e.g., 5 MB).

Figure 15:
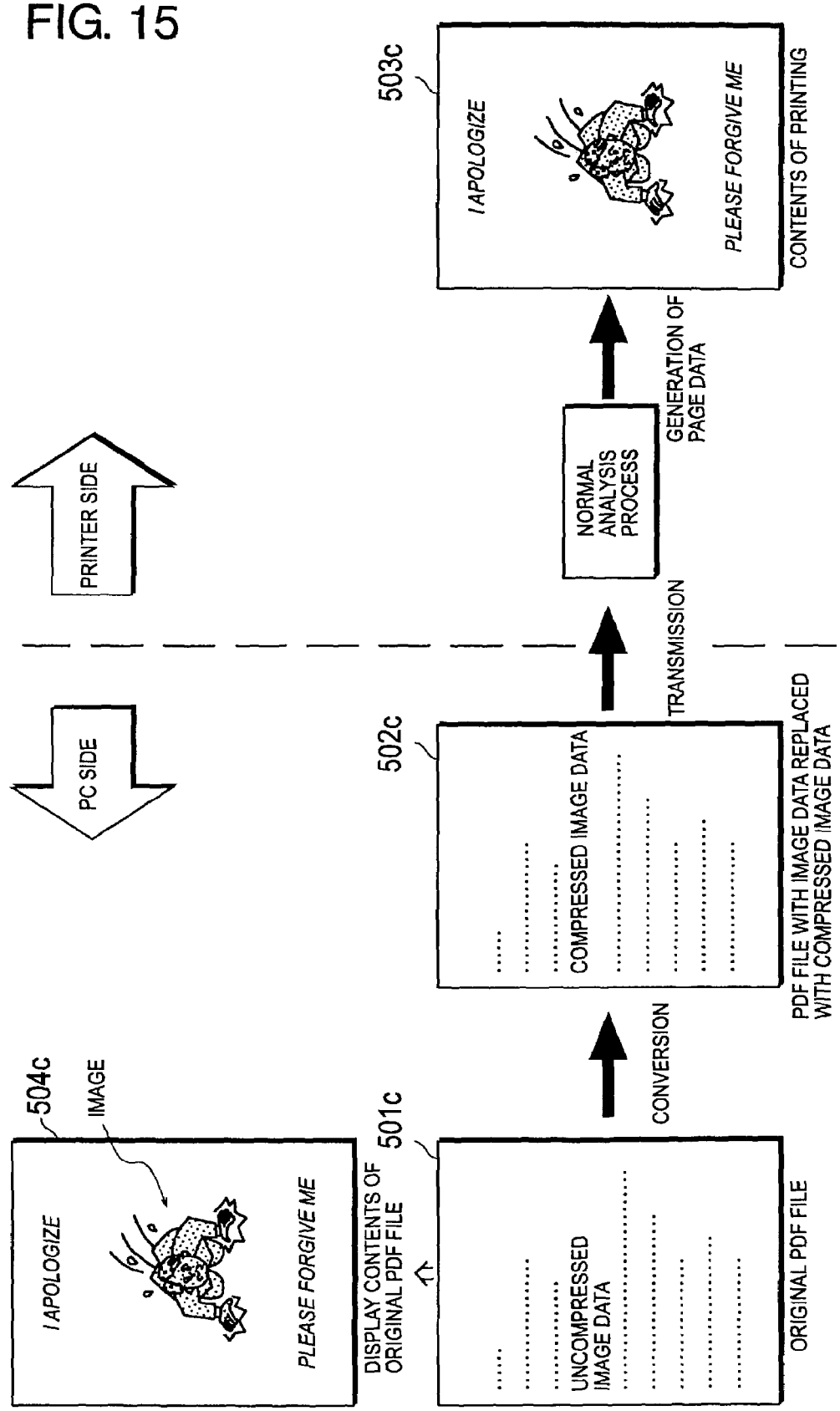
FIG. 15 is an outline diagram for describing a series of steps when the conversion process for the pattern E is executed.
Figure 16:
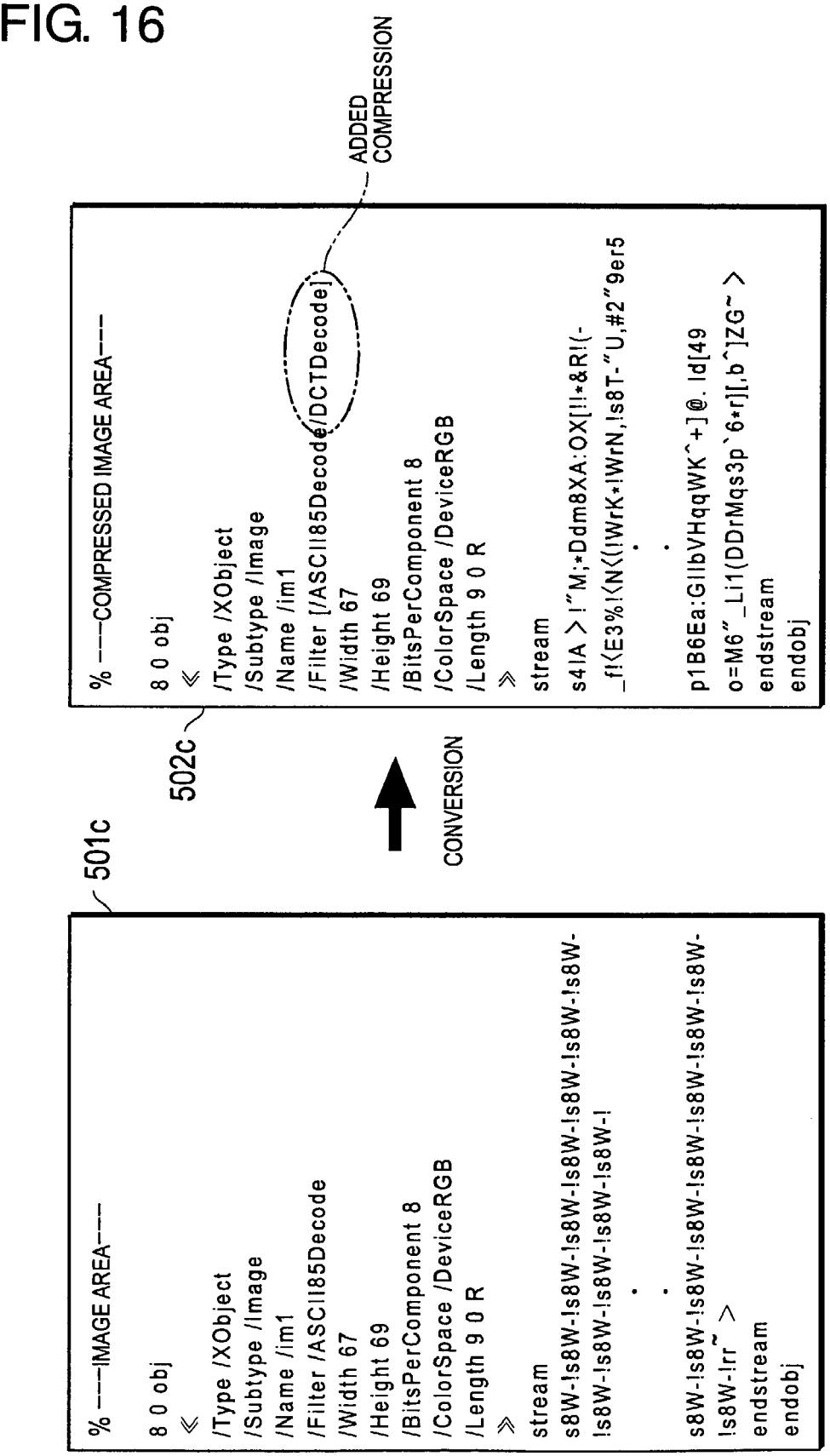
FIG. 16 is a diagram describing the conversion process of the pattern E on the source code level.

FIG. 15 is an outline diagram for describing a series of steps when the conversion process for the pattern E is executed, and FIG. 16 is a diagram describing the conversion process of the pattern E on the source code level.

As shown in FIG. 15 and FIG. 16, the image data included in the PDF file 501*c* that have not been compressed will be compressed in the conversion process of the pattern E (refer to the file 502*c*). In this case, an appropriate compression method will be selected from the compression methods supported by the PDF specification. Therefore, the normal analysis process is applied for the analysis (refer to FIG. 9) of the PDF file. Although it may vary with the compression method, the data substantially reproducing the display contents 504*c* of the original PDF file can thus be printed on paper (refer to the printing contents 503*c*).

Figure 17:
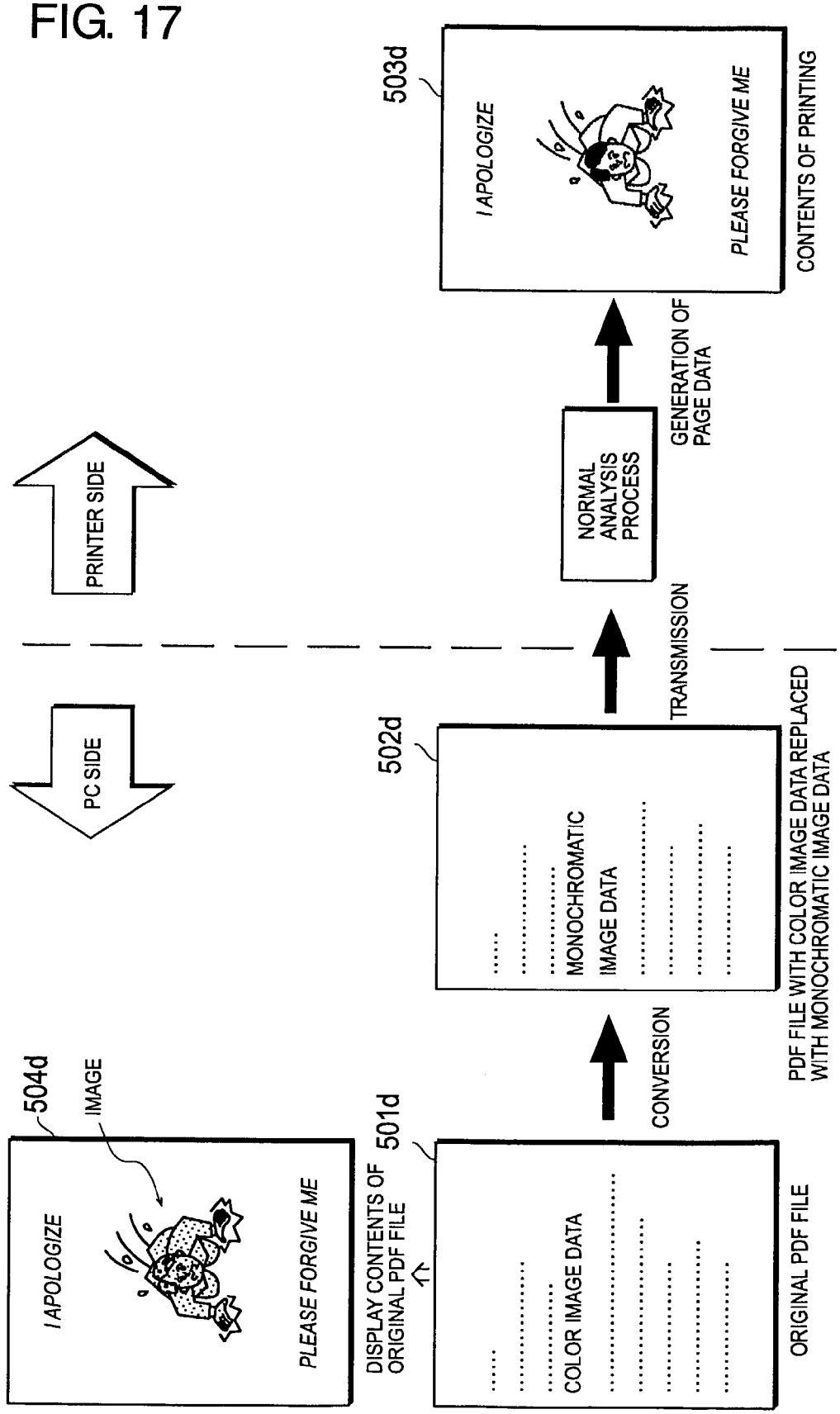
FIG. 17 is an outline diagram for describing a series of steps when the conversion process for the pattern F is executed.
Figure 18:
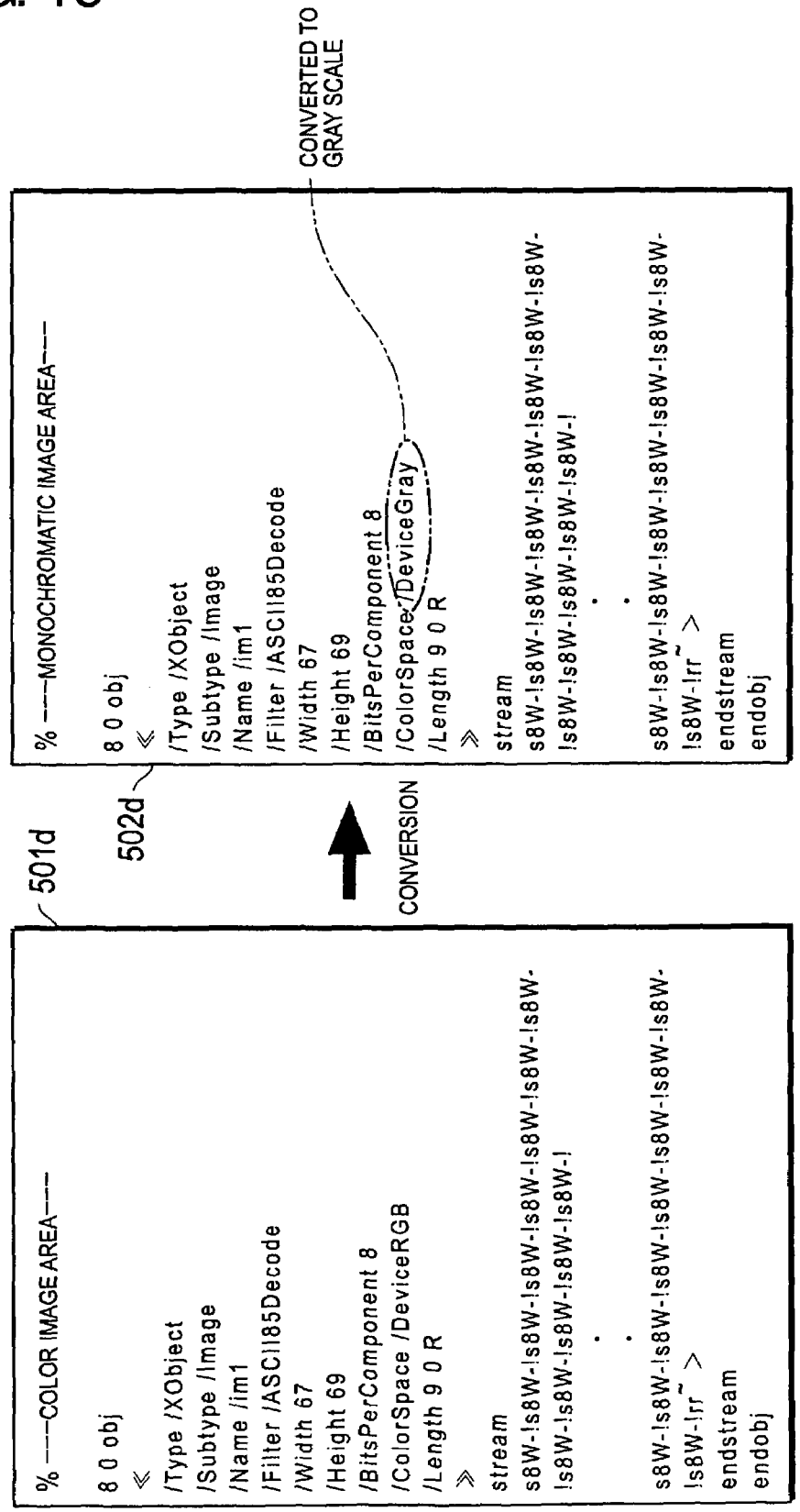
FIG. 18 is a diagram describing the conversion process of the pattern F on the source code level.

FIG. 17 is an outline diagram for describing a series of steps when the conversion process for the pattern F is executed, and FIG. 18 is a diagram describing the conversion process of the pattern F on the source code level.

As shown in FIG. 17 and FIG. 18, color image data included in the PDF file 501*d* will be converted into monochromatic in the conversion process of the pattern F (refer to the file 502*d*). Since the analysis of the PDF file in this case (refer to FIG. 9) is a process applied only to the monochromatic image data, the normal analysis process is applicable. The data reproducing the display contents 504*d* of the original PDF file can thus be printed on paper (refer to the printing contents 503*d*).

Furthermore, in the conversion process of the pattern G, it is so set up that the conversion process of the pattern F is always applied if the output printer is a monochromatic printer.

Figure 19:
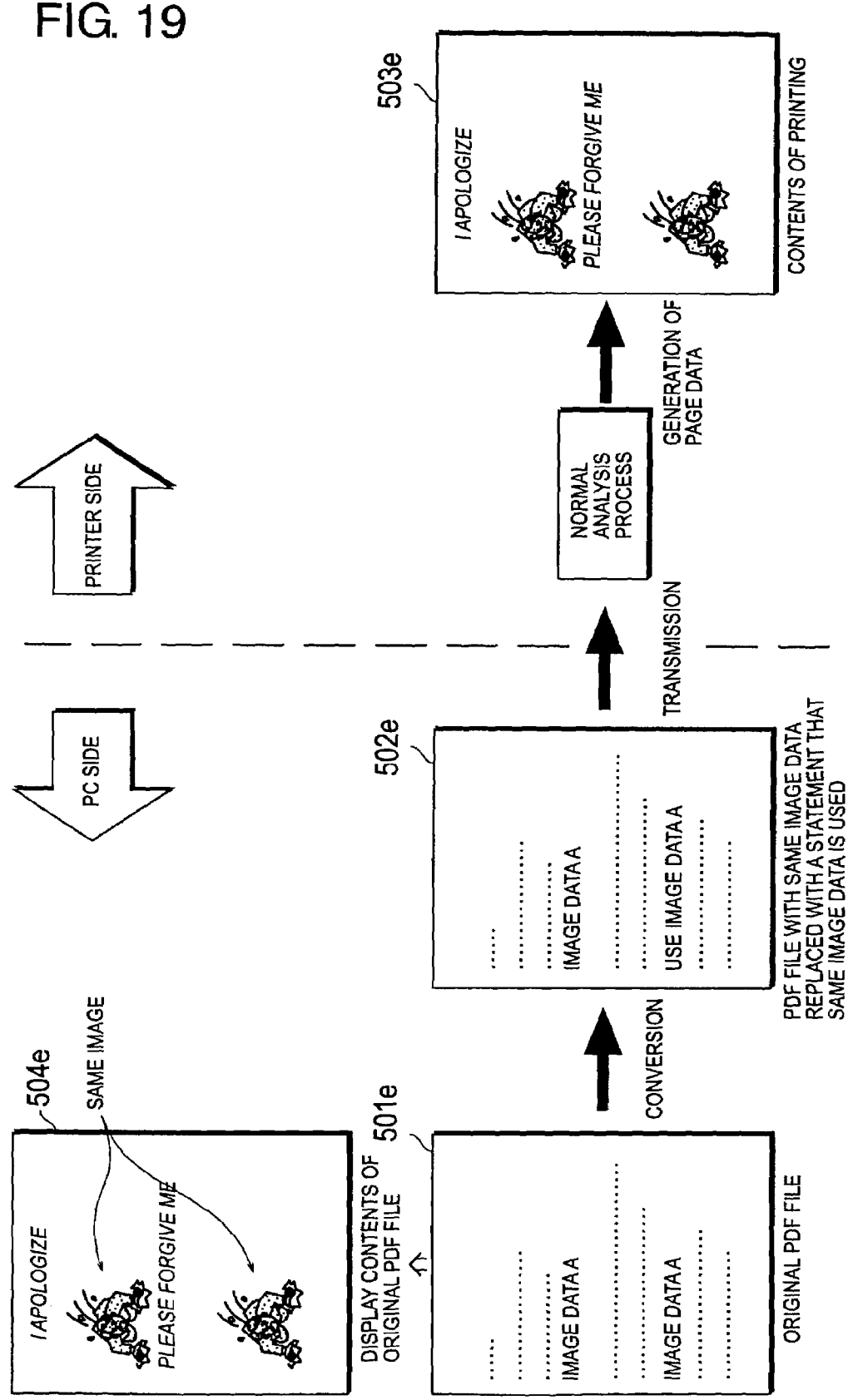
FIG. 19 is an outline diagram for describing a series of steps when the conversion process for the pattern H is executed.

FIG. 19 is an outline diagram for describing a series of steps when the conversion process for the pattern H is executed.

In the conversion process of the pattern H, as shown in FIG. 19, if a plurality of the same image data exists in the PDF file 501*e*, only one image data at one point will be left, while the image data for all other points will be converted into descriptions indicating the data to be used (refer to the file 502*e*). The point that uses the same image data is replaced with the command including the location information of the image data to be used in the file. In this case, the normal analysis process is applicable to the analysis of the PDF file (refer to FIG. 9) as the process of using the same image data is supported by the PDF specification. The data reproducing the display contents 504*e* of the original PDF file can thus be printed on paper (refer to the printing contents 503*e*).

Figure 20:
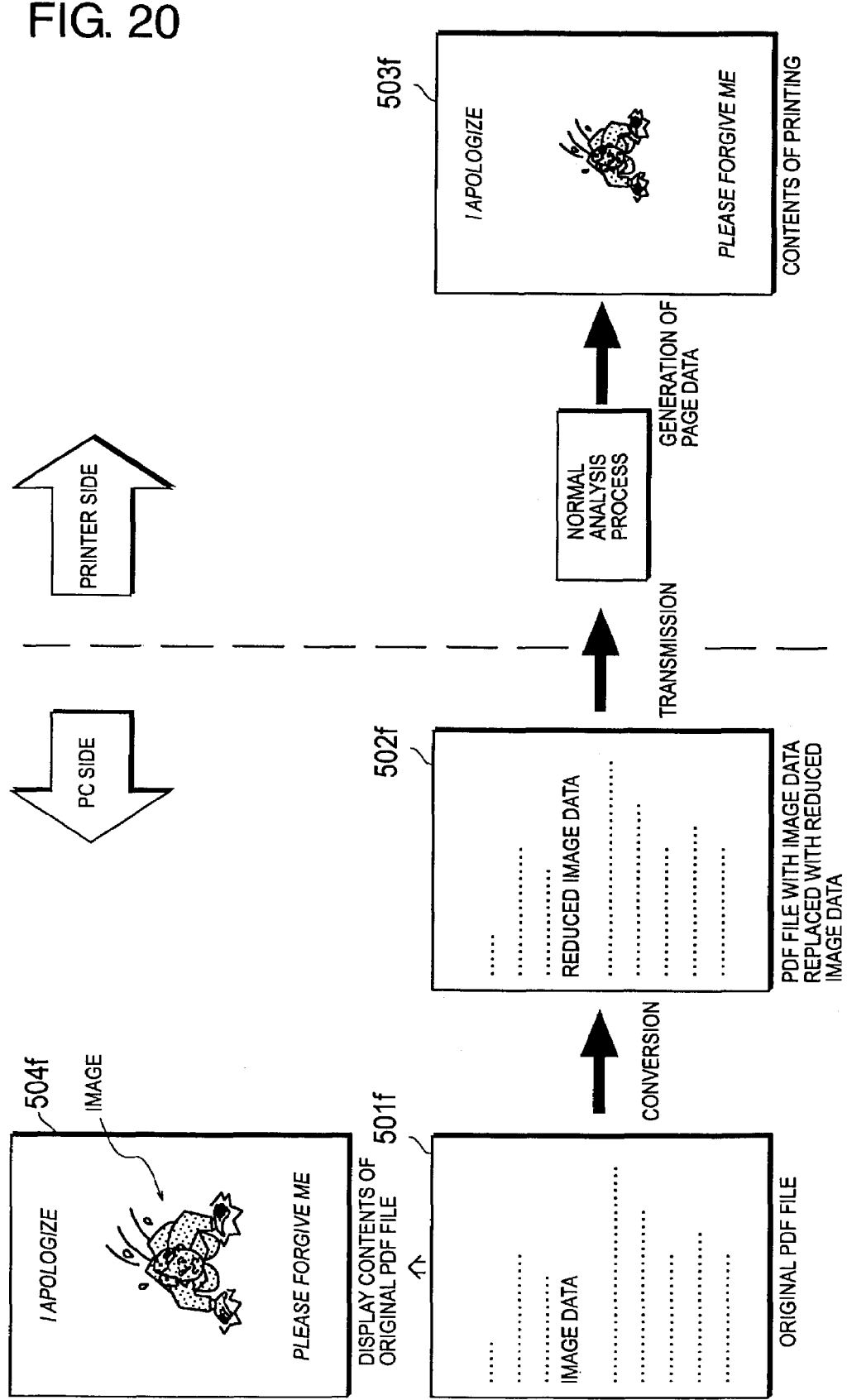
FIG. 20 is an outline diagram for describing a series of steps when the conversion process for the pattern I is executed.
Figure 21:
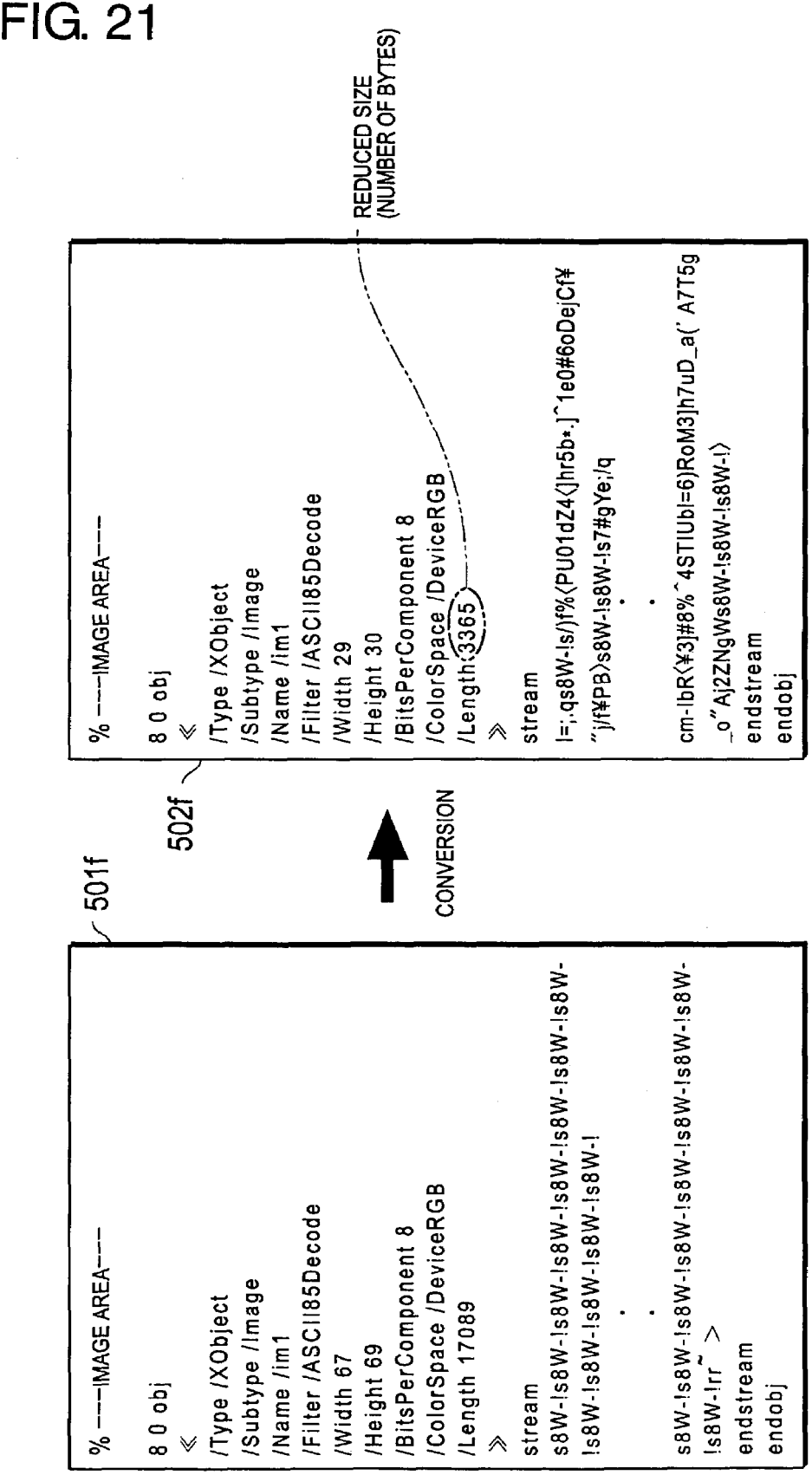
FIG. 21 is a diagram describing the conversion process of the pattern I on the source code level.

FIG. 20 is an outline diagram for describing a series of steps when the conversion process for the pattern I is executed, and FIG. 21 is a diagram describing the conversion process of the pattern I on the source code level.

As shown in FIG. 20 and FIG. 21, image data included in the PDF file 501*f* will be converted into reduced image data in the conversion process of the pattern I (refer to the file 502*f*). The reduced image data (thumb nails) here are obtained by reducing the original image data by reducing the size of the output image. The reduction ratio in relation to the original image data can be set in the initial setting (S101 of FIG. 6). Since the analysis of the PDF file in this case (refer to FIG. 9) is a process applied only to the reduced image data, the normal analysis process is applicable. Reduced images will be printed on paper in place of the images in the display contents 504*f* of the original PDF file (refer to the printing contents 503*f*).

Figure 22:
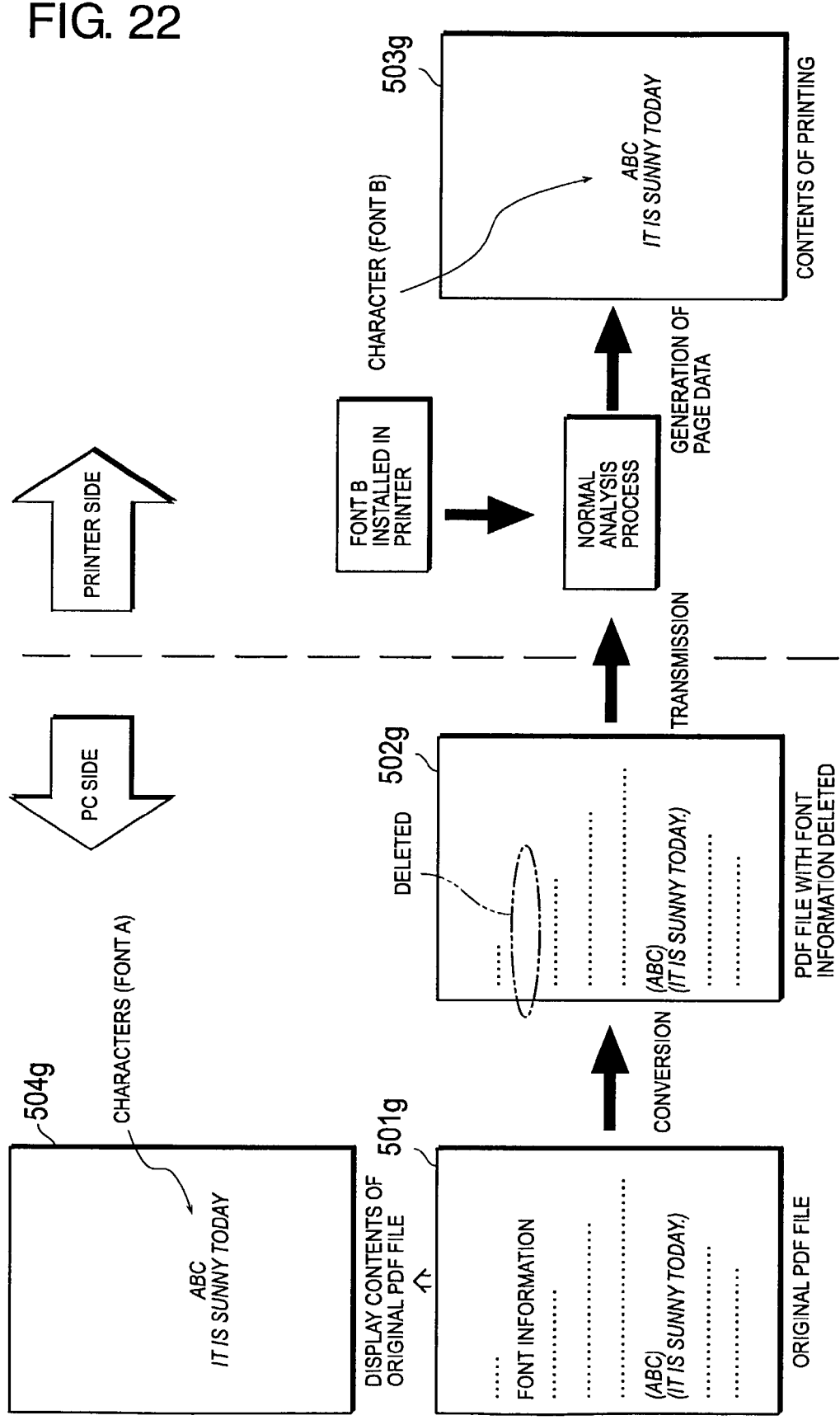
FIG. 22 is an outline diagram for describing a series of steps when the conversion process for the pattern J is executed.
Figure 23:
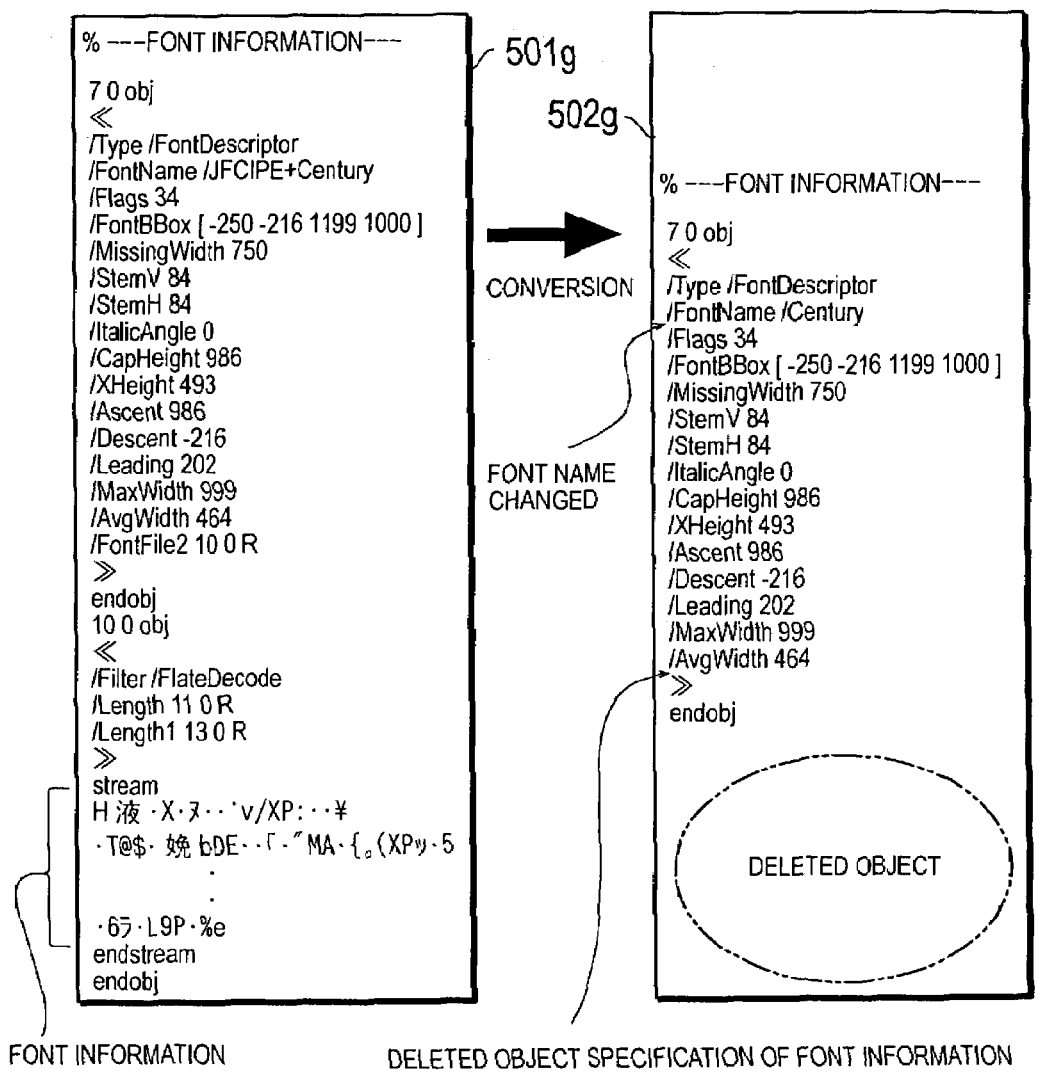
FIG. 23 is a diagram describing the conversion process of the pattern J on the source code level.

FIG. 22 is an outline diagram for describing a series of steps when the conversion process for the pattern J is executed, and FIG. 23 is a diagram describing the conversion process of the pattern J on the source code level.

As shown in FIG. 22 and FIG. 23, if font information is described in the PDF file 501*g*, the font information will be deleted in the conversion process of the pattern J (refer to the file 502*g*). Here the font name to be used will be replaced with the font names installed in the output printer. Since the font information installed in the output printer is used, the normal analysis process is applicable to the analysis of the PDF file (refer to FIG. 9). Characters to be printed on paper are the characters displayed based on the font information installed in the output printer instead of the characters in the display contents 504*g* of the original PDF file, which are displayed based on the font information existing in the file (refer to the printing contents 503*g*).

Figure 24:
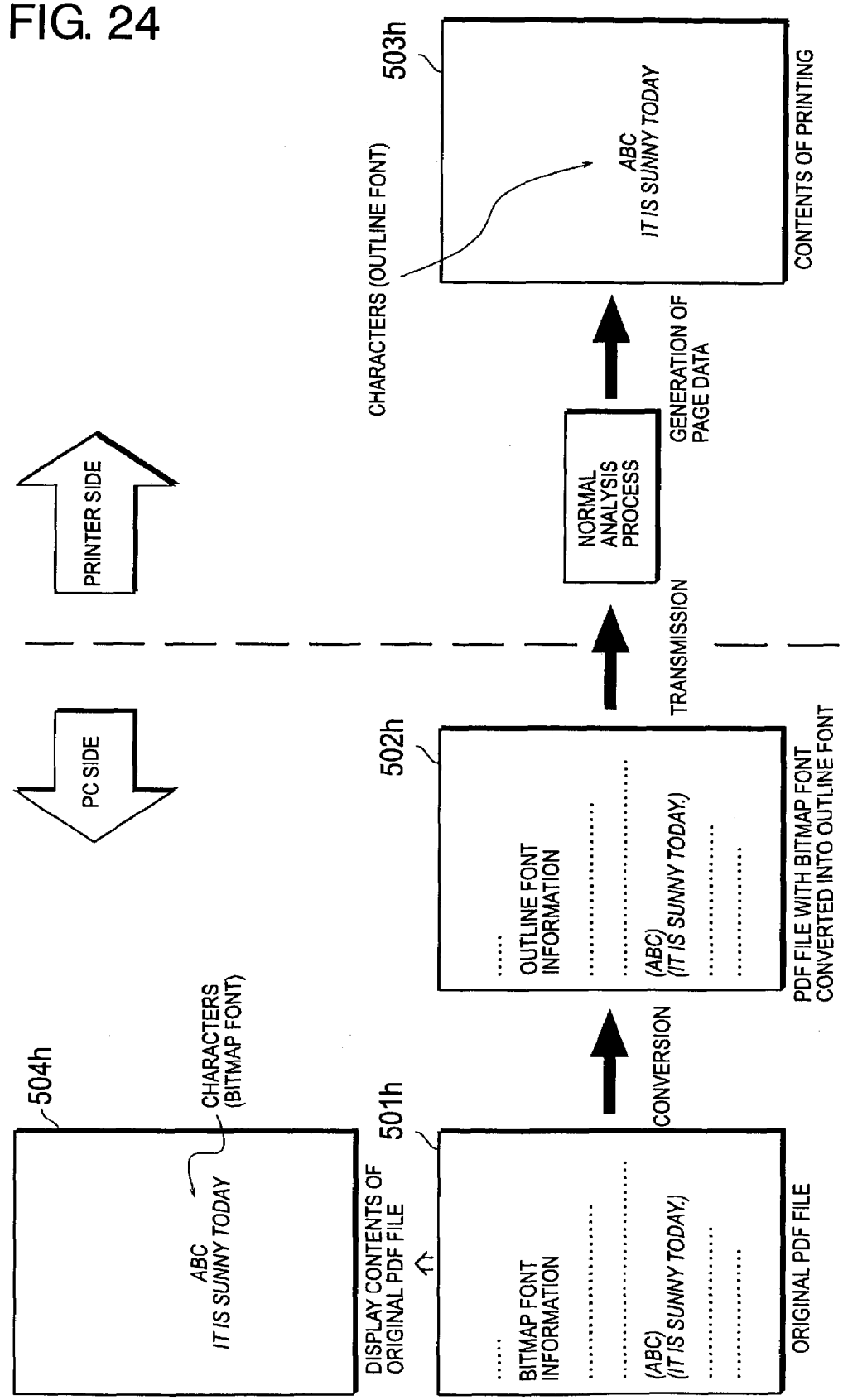
FIG. 24 is an outline diagram for describing a series of steps when the conversion process for the pattern K is executed.

FIG. 24 is an outline diagram for describing a series of steps when the conversion process for the pattern K is executed.

As shown in FIG. 24, if any bitmap font information is described in the PDF file 501*h*, the bitmap information will be converted into outline font information in the conversion process of the pattern K (refer to the file 502*h*). Therefore, the normal analysis process is applicable to the analysis (refer to FIG. 9) of the PDF file as it only uses the outline font information. Characters to be printed on paper are the characters displayed based on the outline font information instead of the characters in the display contents of the original PDF file, which are displayed based on the bitmap font information existing in the file (refer to the printing contents 503*h*). Consequently, the data substantially reproducing the display contents 504*h* of the original PDF file can be printed on paper.

Figure 25:
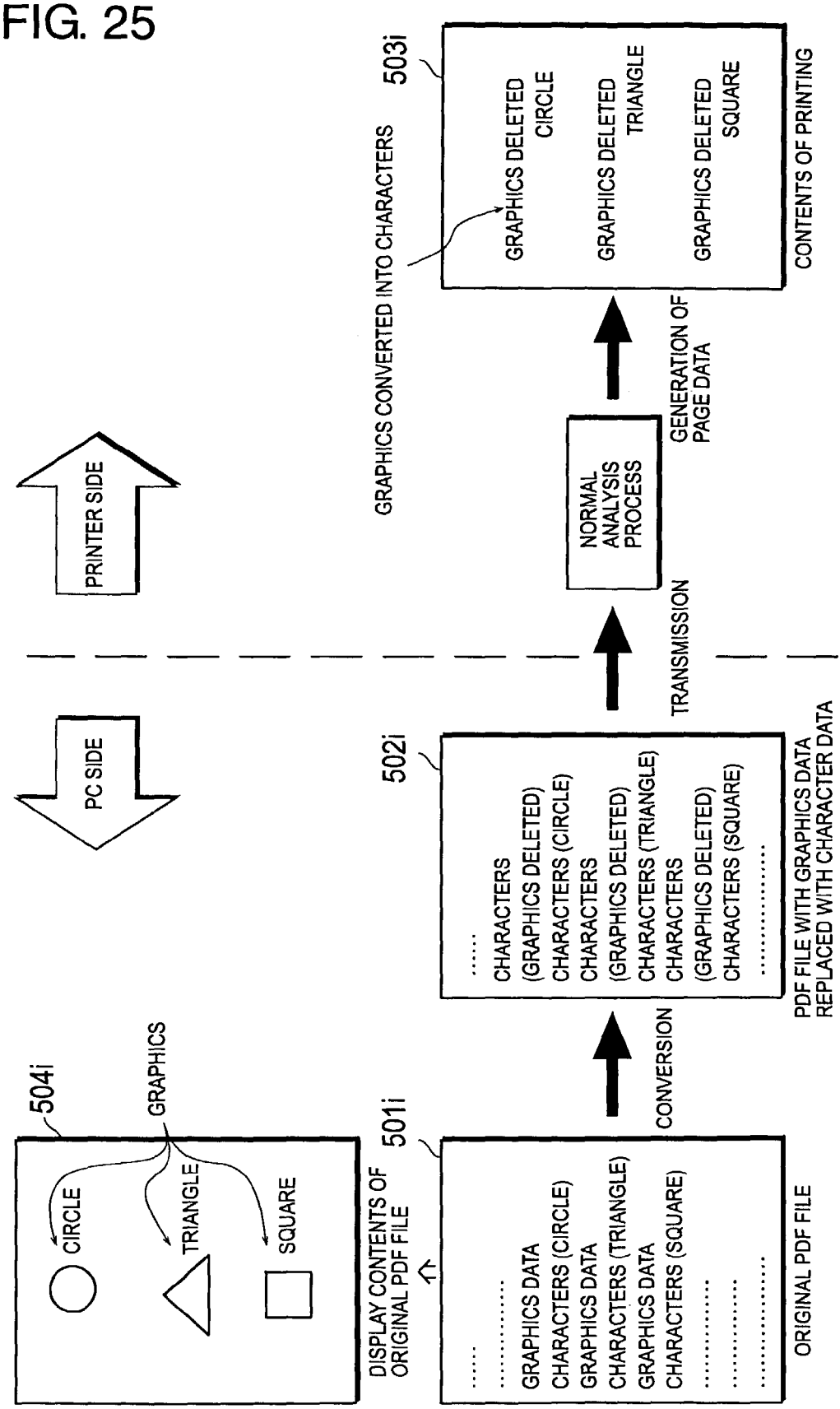
FIG. 25 is an outline diagram for describing a series of steps when the conversion process for the pattern L is executed.
Figure 26:
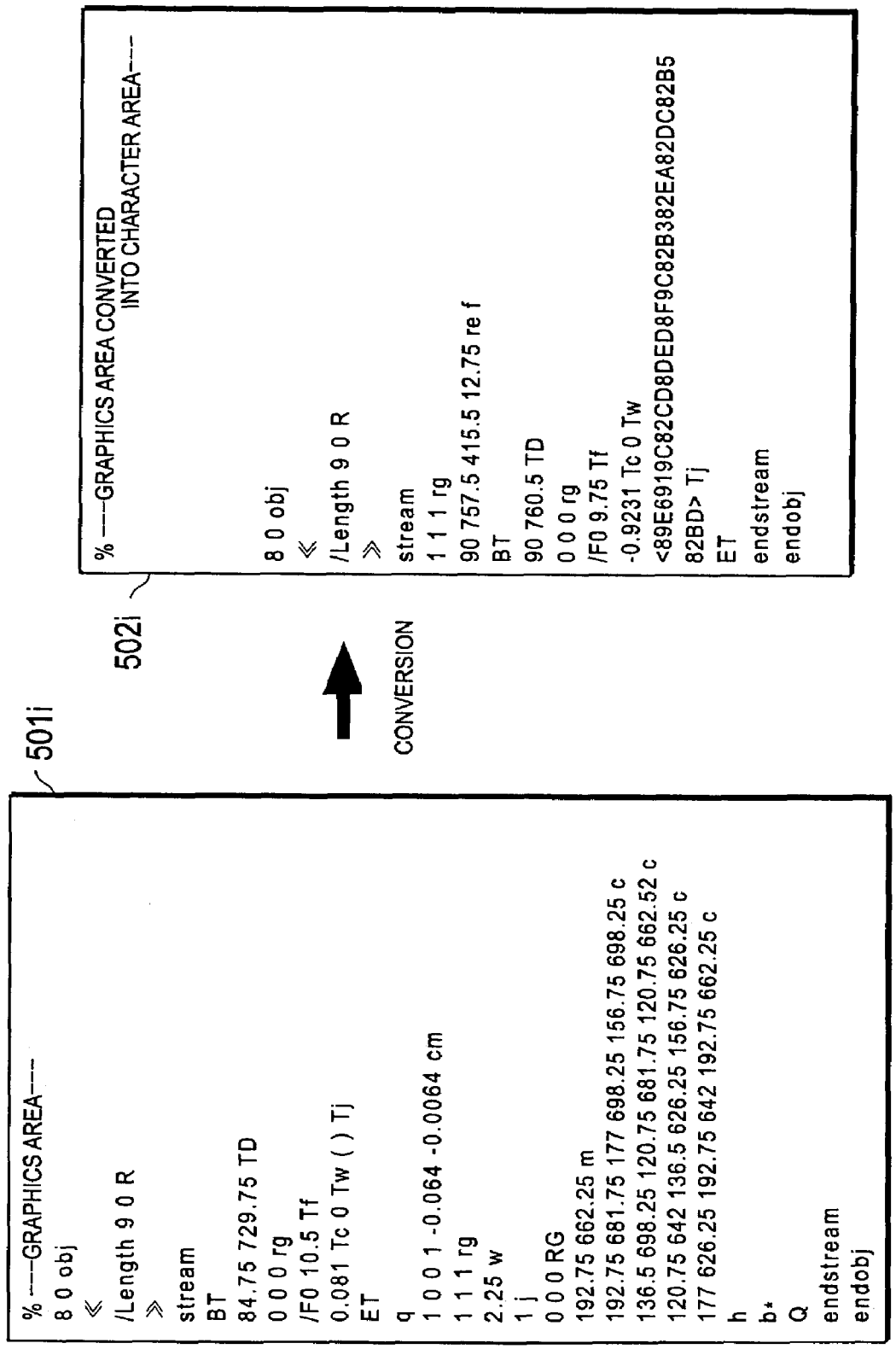
FIG. 26 is a diagram describing the conversion process of the pattern L on the source code level.

FIG. 25 is an outline diagram for describing a series of steps when the conversion process for the pattern L is executed, and FIG. 26 is a diagram describing the conversion process of the pattern L on the source code level.

As shown in FIG. 25 and FIG. 26, all the graphics data included in the PDF file 501*i* are deleted in the conversion process of the pattern L. In this case, it is preferable that the graphics data is rewritten into specific character data (refer to file 502*i*). A comment "Graphics deleted" will be printed on paper in place of the graphics in the display contents 504*i* of the original PDF file (refer to printing contents 503*i*).

As can be seen from the above, in transmitting a document file such as a PDF file to a printer without converting it into a print data described in PDL, e.g., PS, the present embodiment enables the PC to transmit the document file to the printer after reducing the file size by means of converting a specified portion of the objects included in the document file when the storage capacity required for printing the document file exceeds the usable storage capacity of the printer.

Therefore, the embodiment makes it possible to print a document file such as a PDF file safely even when the document file is transmitted to a printer with a limited usable storage capacity without converting it into print data. Moreover, since an appropriate conversion process is done considering the usable capacity of the printer for each object included in the document file in the PC on the document file transmitting side, the transmitting side's load can be alleviated.

Moreover, the printer according to the embodiment can easily handle any special printing conditions such as booklet stitching or face up, which require printing a file in the order different from the order of pages in the file, by analyzing the received document file, as it is possible to transmit the document file in a lump securely from the PC to the printer.

It is obvious that this invention is not limited to the particular embodiments shown and described above but may be variously changed and modified without departing from the technical concept of this invention.

For example, as a device to serve as an image processing device, a computer such as a workstation and a server can be used instead of a PC. It is also possible to use, in place of a printer, an image forming device such as a facsimile machine, a copying machine, or an MFP (multi-function peripheral) that has a combination of their functions.

Although it is constituted in the embodiment described above that the conversion process for the object is to be selected from those of the patterns A through L, other conversion processes, not just those of the patterns A through L, can be used as well so long as the file size can be reduced. Moreover, a portion of the conversion processes of the patterns A through L can be omitted. It is also possible to have a specified group of conversion processes preset as a default, so that the entire preset conversion processes can be executed when necessary. In such a case, the preset conversion process can be a single process or a plurality of processes.

It is also possible to realize the means and method of various processes for transmitting a document file such as a PDF file without converting into print data from the image processing device to the image forming device to be printed by a dedicated hardware circuit or a programmed computer. The program can be provided either by a computer readable recording medium such as a flexible disk and a CD-ROM, or by being supplied on-line via a network such as the Internet. In this case, the program recorded on the computer readable recording medium is normally transferred to and stored in a storage device such as a hard disk. The program can also be provided as independent application software or can be built into the software of the image processing device as a part of its function.

What is claimed is:

1. An image processing device for transmitting a document file, which contains objects that can be arranged in the file in an order different from the order of pages as well as reference information that indicates the locations of said objects within the file, and which defines at least one page having at least one of said objects, to an image forming device without transforming said document file into print data, said image processing device comprising:

an interface for communicating with the image forming device to obtain a usable storage capacity of the image forming device used for printing said document file;

a comparator for comparing the size of a document file to be printed with the obtained usable storage capacity of the image forming device used for printing said document file;

a converter, when the storage capacity required for printing the document file exceeds the usable storage capacity of said image forming device as a result of the comparison by said comparator, for specifying at least one object from among the objects included in said document file in accordance with a specifying condition, converting the at least one specified object to reduce the size of said document file, and maintaining any object included in said document file that is not specified in accordance with the specifying condition in an unconverted state; and a transmitter for transmitting the document file processed by said converter to said image forming device.

2. An image processing device as claimed in claim 1, wherein
said specified object constitutes an image area.

3. An image processing device as claimed in claim 1 wherein
said specified object constitutes a character area.

4. An image processing device as claimed in claim 1, wherein
said specified object constitutes a graphics area.

5. An image processing device as claimed in claim 1, wherein
said specified object constitutes a user-selected area.

6. An image processing device as claimed in claim 1, wherein said document file is a Portable Document Format (PDF) file.

7. An image processing device as claimed in claim 2, wherein, when the storage capacity required for printing said document file exceeds the usable storage capacity of said image forming device as determined from the comparison by said comparator, said converter is operable to convert the image area by performing at least one of:

a) deleting at least one image data in the image area;
b) rewriting at least one image data in the image area into information identifying a storage location of the at least one image data in a transmission source of said document file;
c) deleting at least one image data in the image area having a data size larger than a predetermined data size;
d) rewriting at least one image data in the image area having a data size larger than the predetermined data size into information identifying a storage location of the at least one image data in a transmission source of said document file;
e) converting at least one image data in the image area to a monochromatic image if the at least one image data is a color image;
f) deleting duplicate image data so that only one of the duplicate image data remains in the image area; and
g) reducing a size of image data in the image area to a predetermined data size.

8. An image processing device as claimed in claim 2, wherein, when the storage capacity required for printing the document file exceeds the usable storage capacity of said image forming device as determined from the comparison by said comparator, said converter is operable to convert the image area by compressing each image data in the image area that is not compressed.

9. An image processing device as claimed in claim 1, wherein said image processing device is external to said image forming device.

10. An image processing device as claimed in claim 1, wherein said transmitter is configured to transmit said document file to said image forming device without converting said document file into print data.

11. An image process device as claimed in claim 1, wherein the specifying condition differentiates the objects included in said document file based on respective attributes of each object.

12. An image processing device as claimed in claim 1, wherein:
said comparator is configured to re-compare the size of said document file with the usable storage capacity of the image forming device after said converter has converted the at least one specified object from among the objects included in said document file; and
said converter is configured to convert at least one object included in said document file and not previously converted by said converter to further reduce the size of said document file, when the storage capacity required for printing said document file exceeds the usable storage capacity of the image forming device as a result of the re-comparison by said comparator.

13. An image processing method for transmitting a document file, which includes objects that can be arranged in the file in an order different from the order of pages as well as reference information that indicates the locations of said objects within the file, and which defines at least one page having at least one of said objects, to an image forming device without transforming said document file into print data, said method comprising the steps of:

1) communicating with the image forming device to obtain a usable storage capacity of the image forming device used for printing said document file:

2) comparing the size of a document file to be printed with the obtained usable storage capacity of the image forming device used for printing said document file;

3) specifying, when the storage capacity required for printing the document file exceeds the usable storage capacity of said image forming device as a result of the comparison in step 2), at least one object from among the objects included in said document file in accordance with a specifying condition, converting the at least one specified object to reduce the size of said document file, and maintaining any object included in said document file that is not specified in accordance with the specifying condition in an unconverted state; and 4) transmitting the document file processed in step 3) to said image forming device.

14. An image processing method as claimed in claim 13, wherein said specified object constitutes an image area.

15. An image processing method as claimed in claim 13, wherein
said specified object constitutes a character area.

16. An image processing method as claimed in claim 13, wherein
said specified object constitutes a graphics area.

17. An image processing method as claimed in claim 13, wherein
said specified object constitutes a user-selected area.

18. An image processing method as claimed in claim 13, wherein said document file is a Portable Document Format (PDF) file.

19. An image processing method as claimed in claim 14, wherein, when the storage capacity required for printing the document file exceeds the usable storage capacity of said image forming device as determined from the comparison in step 2), said step 3) comprises converting the image area by performing at least one of:
a) deleting at least one image data in the image area;
b) rewriting at least one image data in the image area into information identifying a storage location of the at least one image data in a transmission source of said document file;
c) deleting at least one image data in the image area having a data size larger than a predetermined data size;
d) rewriting at least one image data in the image area having a data size larger than the predetermined data size into information identifying a storage location of the at least one image data in a transmission source of said document file;
e) converting at least one image data in the image area to a monochromatic image if the at least one image data is a color image;
f) deleting duplicate image data so that only one of the duplicate image data remains in the image area; and
g) reducing a size of image data in the image area to a predetermined data size.

20. An image processing method as claimed in claim 14, wherein, when the storage capacity required for printing said document file exceeds the usable storage capacity of said image forming device as determined from the comparison in step 2), said step 3) comprises converting the image area by compressing each image data in the image area that is not compressed.

21. An image processing method as claimed in claim 13, wherein said step 4) 4Lcomprises transmitting said document file to said image forming device without converting said document file into print data.

22. An image processing method as claimed in claim 13, wherein the specifying condition differentiates the objects included in said document file based on respective attributes of each object.

23. An image processing method as claimed in claim 13, further comprising the steps of:
3a) re-comparing the size of said document file with the usable storage capacity of the image forming device after the at least one specified objected has been converted in step 3); and
3b) converting at least one object included in said document file and not previously converted by said converter to further reduce the size of said document file, when the storage capacity required for printing said document file exceeds the usable storage capacity of the image forming device as a result of the re-comparison in step 3a),
wherein said step 4) comprises transmitting the document file processed in step 3b) to said image forming device.

24. A computer-readable recording medium having a program recorded thereon, said program being executed in an image processing device for transmitting a document file, which includes objects that can be arranged in the file in an order different from the order of pages as well as reference information that indicates the locations of said objects within the file, and which defines at least one page having at least one of said objects, to an image forming device without transforming said document file into print data, said program causing the image processing device to execute a process comprising the steps of:

1) communicating with the image forming device to obtain a usable storage capacity of the image forming device used for printing said document file;

2) comparing the size of a document file to be printed with the obtained usable storage capacity of the image forming device used for printing said document file;

3) specifying, when the storage capacity required for printing the document file exceeds the usable storage capacity of said image forming device as a result of the comparison in step 2), at least one object from among the objects included in said document file in accordance with a specifying condition, converting the at least one specified object to reduce the size of said document filet and maintaining any object included in said document file that is not specified in accordance with the specifying condition in an unconverted state; and 4) transmitting the document file processed in step 3) to said image forming device.

25. A computer-readable recording medium as claimed in claim 24, wherein said specified object constitutes an image area.

26. A computer-readable recording medium as claimed in claim 24, wherein said specified object constitutes a character area.

27. A computer-readable recording medium as claimed in claim 24, wherein said specified object constitutes a graphics area.

28. A computer-readable recording medium as claimed in claim 24, wherein said specified object constitutes a user-selected area.

29. A computer-readable recording medium as claimed in claim 24, wherein said document file is a Portable Document Format (PDF) file.

30. A computer-readable recording medium as claimed in claim 25, wherein, when the storage capacity required for printing said document file exceeds the usable storage capacity of said image forming device as determined from the comparison in step 2), said step 3) comprises converting the image area by performing at least one of:

a) deleting at least one image data in the image area;

b) rewriting at least one image data in the image area into information identifying a storage location of the at least one image data in a transmission source of said document file;

c) deleting at least one image data in the image area having a data size larger than a predetermined data size;

d) rewriting at least one image data in the image area having a data size larger than the predetermined data size into information identifying a storage location of the at least one image data in a transmission source of said document file;

e) converting at least one image data in the image area to a monochromatic image if the at least one image data is a color image;

f) deleting duplicate image data so that only one of the duplicate image data remains in the image area; and g) reducing a size of image data in the image area to a predetermined data size.

31. A computer-readable recording medium as claimed in claim 14, wherein, when the storage capacity required for printing said document file exceeds the usable storage capacity of said image forming device as determined from the comparison in step 2), said step 3) comprises converting the image area by compressing each image data in the image area that is not compressed.

32. A computer-readable recording medium as claimed in claim 24, wherein said image processing device in which said program is executed is external to said image forming device.

33. A computer-readable recording medium as claimed in claim 24, wherein said step 4) comprises transmitting said document file to said image forming device without converting said document file into print data.

34. A computer-readable recording medium as claimed in claim 24, wherein the specifying condition differentiates the objects included in said document file based on respective attributes of each object.

35. A computer-readable recording medium as claimed in claim 24, further comprising the steps of:

3a) re-comparing the size of said document file with the usable storage capacity of the image forming device after the at least one specified objected has been converted in step 3); and 3b) converting at least one object included in said document file and not previously converted by said converter to further reduce the size of said document file, when the storage capacity required for printing said document file exceeds the usable storage capacity of the image forming device as a result of the re-comparison in step 3a), wherein said step 4) comprises transmitting the document file processed in step 3b) to said image forming device.

* * * * *